United States Patent
Shima et al.

(10) Patent No.: US 12,244,398 B2
(45) Date of Patent: Mar. 4, 2025

(54) SATELLITE COMMUNICATION SYSTEM, EARTH STATION DEVICE AND LINE SWITCHING CONTROL METHOD

(71) Applicant: NIPPON TELEGRAPH AND TELEPHONE CORPORATION, Tokyo (JP)

(72) Inventors: Masaki Shima, Musashino (JP); Fumihiro Yamashita, Musashino (JP); Hiroki Shibayama, Musashino (JP); Kiyohiko Itokawa, Musashino (JP); Mitsuru Nishino, Musashino (JP); Koichi Harada, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 334 days.

(21) Appl. No.: 17/801,355

(22) PCT Filed: Feb. 26, 2020

(86) PCT No.: PCT/JP2020/007767
§ 371 (c)(1),
(2) Date: Aug. 22, 2022

(87) PCT Pub. No.: WO2021/171424
PCT Pub. Date: Sep. 2, 2021

(65) Prior Publication Data
US 2023/0072278 A1     Mar. 9, 2023

(51) Int. Cl.
*H04B 7/185* (2006.01)
(52) U.S. Cl.
CPC ..... *H04B 7/18517* (2013.01); *H04B 7/18513* (2013.01)

(58) Field of Classification Search
CPC ... H04B 7/18517; H04B 7/18513; H04B 7/15
See application file for complete search history.

(56) References Cited

U.S. PATENT DOCUMENTS

| 2012/0170503 A1* | 7/2012 | Kelley | H04W 48/06 370/312 |
| 2015/0011163 A1* | 1/2015 | Brazerol | H04H 60/51 455/154.1 |

FOREIGN PATENT DOCUMENTS

| JP | 2008252607 A | 10/2008 |
| JP | 2008252608 A | 10/2008 |

(Continued)

OTHER PUBLICATIONS

English Translation for JP 2008278435 A (Year: 2008).*

*Primary Examiner* — Sun Jong Kim

(57) ABSTRACT

A method or a first earth station in a satellite communication system including a plurality of earth stations connected by a single-hop connection accommodating corresponding terminals is provided. The method includes encapsulating a first control message received from a first terminal in a first control signal to transfer the first control signal including the encapsulated first control message through a first controlling line to a second earth station accommodating a second terminal on an incoming side among the plurality of earth stations; and performing circuit-switching of the first communicating line between the first earth station and the second earth station in accordance with the first control message.

5 Claims, 10 Drawing Sheets

(56) References Cited

FOREIGN PATENT DOCUMENTS

| | | | |
|---|---|---|---|
| JP | 2008252609 A | | 10/2008 |
| JP | 2008278434 A | | 11/2008 |
| JP | 2008278435 A | * | 11/2008 |

* cited by examiner

SATELLITE COMMUNICATION SYSTEM, EARTH STATION DEVICE AND LINE SWITCHING CONTROL METHOD

CROSS-REFERENCE TO RELATED APPLICATIONS

This application is a 371 U.S. National Phase of International Application No. PCT/JP2020/007767, filed on Feb. 26, 2020. The entire disclosure of the above application is incorporated herein by reference.

TECHNICAL FIELD

The present invention relates to a Very Small Aperture Terminal (VSAT) system including a plurality of earth station apparatuses and a control earth station apparatus, each of the plurality of station apparatuses accommodating a terminal apparatus configured to perform a session connection using a Session Initiation Protocol (SIP).

BACKGROUND ART

The VSAT system is a form of a satellite communication system in which a VSAT earth station apparatus provided with an ultra-small aperture antenna performs bidirectional communication via a relay satellite, and includes a relay satellite, a VSAT control earth station apparatus performing communication control, and VSAT earth station apparatuses located at respective locations.

Conventionally, the VSAT system requires a VSAT control earth station apparatus that is responsible for controlling transmission of the VSAT earth station apparatus. Examples of a method for controlling transmission of the VSAT earth station apparatus include a method for securing a controlling line dedicated to a control signal (a Common Signalling Channel (CSC) line) separate from a communicating line for voice and data. A control signal transmitted from the VSAT control earth station apparatus to the VSAT earth station apparatus is called a Common Signaling Channel Outband (CSCO) signal, and a control signal transmitted from the VSAT earth station apparatus to the VSAT control earth station apparatus is called a Common Signaling Channel Inband (CSCI) signal. In addition, in a case that each frequency is fixedly assigned as a transmission carrier for a controlling line and a communicating line using a Single Channel Per Carrier (SCPC) scheme for assigning one carrier wave per line, that is one type of Frequency Division Multiple Access (FDMA), the VSAT control earth station apparatus, in general, and exclusively uses a CSCO carrier to broadcast the CSCO signal to all the VSAT earth station apparatuses in a continuous signal. In contrast, the CSCI signal is mainly a response for the CSCO signal, and thus, a method is used in which the CSCI signal is made into a burst signal for sharing one CSCI carrier between a plurality of VSAT earth station apparatuses using time division and random time transmission to effectively use a frequency domain and simplify a configuration of a transceiver circuit of the VSAT earth station apparatus. For example, if Peer To Peer (P to P) bidirectional communication is performed between two VSAT earth station apparatuses (a VSAT earth station apparatus (#a) and a VSAT earth station apparatus (#b)), two connection modes are contemplated, a double hop connection in which relay satellites are passed through twice via a HUB station apparatus, and a single hop connection in which the VSAT earth station apparatus (#a) and the VSAT earth station apparatus (#b) perform communication passing through the relay satellite only once. In the double hop connection using the SCPC scheme through a HUB earth station apparatus that also serves as the VSAT control earth station apparatus, a transmission and/or reception carrier for the communicating line is individually fixedly assigned between the VSAT earth station apparatus and a master station apparatus (the HUB earth station apparatus also serving as the VSAT control earth station apparatus), and the master station apparatus and the all VSAT earth station apparatuses are connected in a star topology. In this case, bidirectional communication between the VSAT earth station apparatuses is enabled by IP routing or the like via a network connected to the master station apparatus or the like. Therefore, the VSAT earth station apparatuses do not need to directly line-switch the communicating lines with each other. In contrast, in the single hop connection, the VSAT earth station apparatus (#a) adjusts a frequency of a reception carrier (referred to as a reception frequency) to a frequency of a transmission carrier of the VSAT earth station apparatus (#b) (referred to as a transmission frequency), and the VSAT earth station apparatus (#b) adjusts a reception frequency to a transmission frequency of the VSAT earth station apparatus (#a), which allows bidirectional communication between the VSAT earth station apparatuses (#a) and (#b). However, the single hop connection is widely used as a P to P-dedicated line with a connection destination being fixed, where in a case that the connection destination is changed, the VSAT earth station apparatuses need the circuit switching directly with each other.

In this manner, in the case of the single hop connection, in order to establish the P to P communication, circuit switching control is required in which each of outgoing side and incoming side VSAT earth station apparatuses adjusts the reception frequency for its own communicating line to the transmission frequency of the opposing side VSAT earth station apparatus. In other words, a means by which a connection request is sent from the outgoing side VSAT earth station apparatus to the incoming side VSAT earth station apparatus in a state of not being connected with the communicating line to change the reception frequency of the incoming side VSAT earth station apparatus is required.

On the other hand, an antenna of the VSAT earth station apparatus needs to be installed at a location where the satellite to be utilized is visible, and in many cases, the antenna is to be installed outdoors. Therefore, a terminal to be used cannot be necessarily installed in the vicinity where the antenna is installed. In a case that the VSAT earth station apparatus is separated into an outdoor unit (ODU) such as the antenna and an indoor unit (IDU) such as a modem function, a cable length of a coaxial cable that transmits radio signals between the ODU and the IDU is limited due to a transmission power output of the VSAT earth station apparatus, an antenna reception gain, a signal resolution of the modem, and the like. Therefore, a case is assumed in which the IDU of the VSAT earth station apparatus and the terminal to be used cannot be necessarily installed at the same location. In a case that a communication destination of the P to P communication in the single hop connection is desired to be switched, an operation of the VSAT earth station apparatus is required at the installation location of the VSAT earth station apparatus or at the installation location of the IDU different from a terminal operation location, which leads to a problem of complicated operation. In particular, in a case of telephony use, a means for circuit-switching of a satellite communicating line to the incoming side VSAT earth station apparatus in conjunction with a call control on the telephone is required.

On the other hand, in typical IP networks, SIP is widely used as a protocol for signaling initiation, termination, and the like of a session for an IP phone and the like. A system for performing SIP communication over the IP network mainly includes a SIP user agent (SIP User Agent Client (SIP_UAC)), a SIP User Agent Server (SIP_UAS), a SIP server (SIP proxy Server, redirect server, registrar server), and a location server that stores and responds a contact IP address for a SIP Uniform Resource Identifier (SIP_URI) in cooperation with the SIP server.

The SIP proxy server includes a call stateful proxy and a transaction stateless proxy, and the call stateful proxy uses Record-Route field data for "INVITE method" to relay all SIP communications by the SIP proxy server, where the SIP proxy server can grasp a SIP transaction state. In the case of the call stateful proxy, a "BYE method" may not be returned to the SIP proxy server due to a network failure or the like (in a case of confirmation failure). In this case, the SIP proxy server erroneously recognizes the SIP transaction state, thereby causing the SIP_UAS to be unable to initiate a new session or the like, which leads to a problem. Therefore, there is a need to periodically confirm an existence of a session by a SIP timer and perform automatic close processing of the session at the time of the confirmation failure.

A technique is under study, as such a technique for performing an IP phone call on the IP network in the satellite communication system, for coordinating a satellite communication system with a SIP packet when the IP phone is used between the earth station apparatuses (for example, see PTLs 1 to 5).

CITATION LIST

Patent Literature

PTL 1: JP 2008-252607 A
PTL 2: JP 2008-252608 A
PTL 3: JP 2008-252609 A
PTL 4: JP 2008-278434 A
PTL 5: JP 2008-278435 A

SUMMARY OF THE INVENTION

Technical Problem

However, the above-described technique is a technique that uses a satellite channel in a Demand Assigned Multiple Access (DAMA) scheme rather than the transmission frequency fixed assignment scheme, and requires cooperation with a DAMA apparatus on the master station apparatus side by converting the SIP packet into a control signal format.

As described above, in the related art, no method is considered for circuit-switching of the communicating line between the VSAT earth station apparatuses that are P to P-connected in the single hop in the VSAT system not having the DAMA apparatus that uses the satellite channel in the transmission frequency fixed assignment scheme.

An object of the present invention is to provide a satellite communication system, an earth station apparatus, and a circuit switching control method capable of circuit-switching of a communicating line between VSAT earth station apparatuses performing a P to P communication in a single hop connection in the satellite channel using the simple transmission frequency fixed assignment scheme by such a way in which SIP packets are encapsulated in a control signal and transmitted from an outgoing side earth station apparatus via a relay satellite to a control earth station apparatus, the encapsulated control signal is transparently transmitted from the control earth station apparatus via the relay satellite to an incoming earth station apparatus, and a reception frequency of the own apparatus is adjusted to a transmission frequency of the opposing earth station apparatus in accordance with information of the SIP packets.

Means for Solving the Problem

The present invention relates to a satellite communication system including: a plurality of earth station apparatuses; and a control earth station apparatus, the plurality of earth station apparatuses each accommodating a terminal apparatus that establishes a session by using a control message being dedicated to perform communication, the control earth station apparatus transmitting and/or receiving a control signal on a controlling line to an earth station apparatus of the plurality of earth station apparatuses via a relay satellite, and the satellite communication system performing circuit-switching of a communicating line between the plurality of earth station apparatuses that are connected by single-hop connection to allow a plurality of the terminal apparatuses to perform communication with each other, wherein a first earth station apparatus accommodating a first terminal apparatus on an outgoing side among the plurality of earth station apparatuses encapsulates the control message received from the first terminal apparatus in the control signal to transfer the encapsulated resultant through the controlling line to a second earth station apparatus accommodating a second terminal apparatus on an incoming side among the plurality of earth station apparatuses, and performs circuit-switching of the communicating line between the first earth station apparatus and the second earth station apparatus in accordance with the control message.

The present invention relates to an earth station apparatus configured to accommodate a terminal apparatus that establishes a session by using a control message being dedicated to perform communication, transmit and/or receive a control signal on a controlling line to a control earth station apparatus via a relay satellite, and perform circuit-switching of a communicating line that is connected by single-hop connection, wherein in a case that the earth station apparatus is on an outgoing side, the earth station apparatus encapsulates the control message received from a certain terminal apparatus in the control signal to transfer the encapsulated resultant through the controlling line to an earth station apparatus on an incoming side accommodating the terminal apparatus on the incoming side, and performs circuit-switching of the communicating line to the earth station apparatus on the incoming side in accordance with the control message.

The present invention relates to a circuit switching control method in a satellite communication system, the satellite communication system including a plurality of earth station apparatuses and a control earth station apparatus, the plurality of earth station apparatuses each accommodating a terminal apparatus that establishes a session by using a control message being dedicated to perform communication, the control earth station apparatus transmitting and/or receiving a control signal on a controlling line between the plurality of earth station apparatuses via a relay satellite, and the satellite communication system performing circuit-switching of a communicating line between the plurality of earth station apparatuses that are connected by single-hop connection to perform communication between a plurality of the terminal apparatuses, the circuit switching control method including: by a first earth station apparatus accommodating a first terminal apparatus on an outgoing side among the plurality of earth station apparatuses, encapsulating the control message received from the first terminal apparatus in the control signal to transfer the encapsulated resultant through the controlling line to a second earth station apparatus accommodating a second terminal apparatus on an incoming side among the plurality of earth station apparatuses; and performing circuit-switching of the communicating line between the first earth station apparatus and the second earth station apparatus in accordance with the control message.

Effects of the Invention

A satellite communication system, an earth station apparatus, and a circuit switching control method according to the present invention are capable of circuit-switching of a communicating line between VSAT earth station apparatuses performing a P to P communication in a single hop connection in the satellite channel using the simple transmission frequency fixed assignment scheme by such a way that in which SIP packets are encapsulated in a control signal and transmitted from an outgoing side earth station apparatus via a relay satellite to a control earth station apparatus, the encapsulated control signal is transparently transmitted from the control earth station apparatus via the relay satellite to an incoming earth station apparatus, and a reception frequency of the incoming side apparatus is adjusted to a transmission frequency of the opposing earth station apparatus in accordance with information of the SIP packets.

DESCRIPTION OF EMBODIMENTS

Hereinafter, an embodiment of a satellite communication system, an earth station apparatus, and a circuit switching control method according to the present invention will be described with reference to the drawings.

Figure 1:
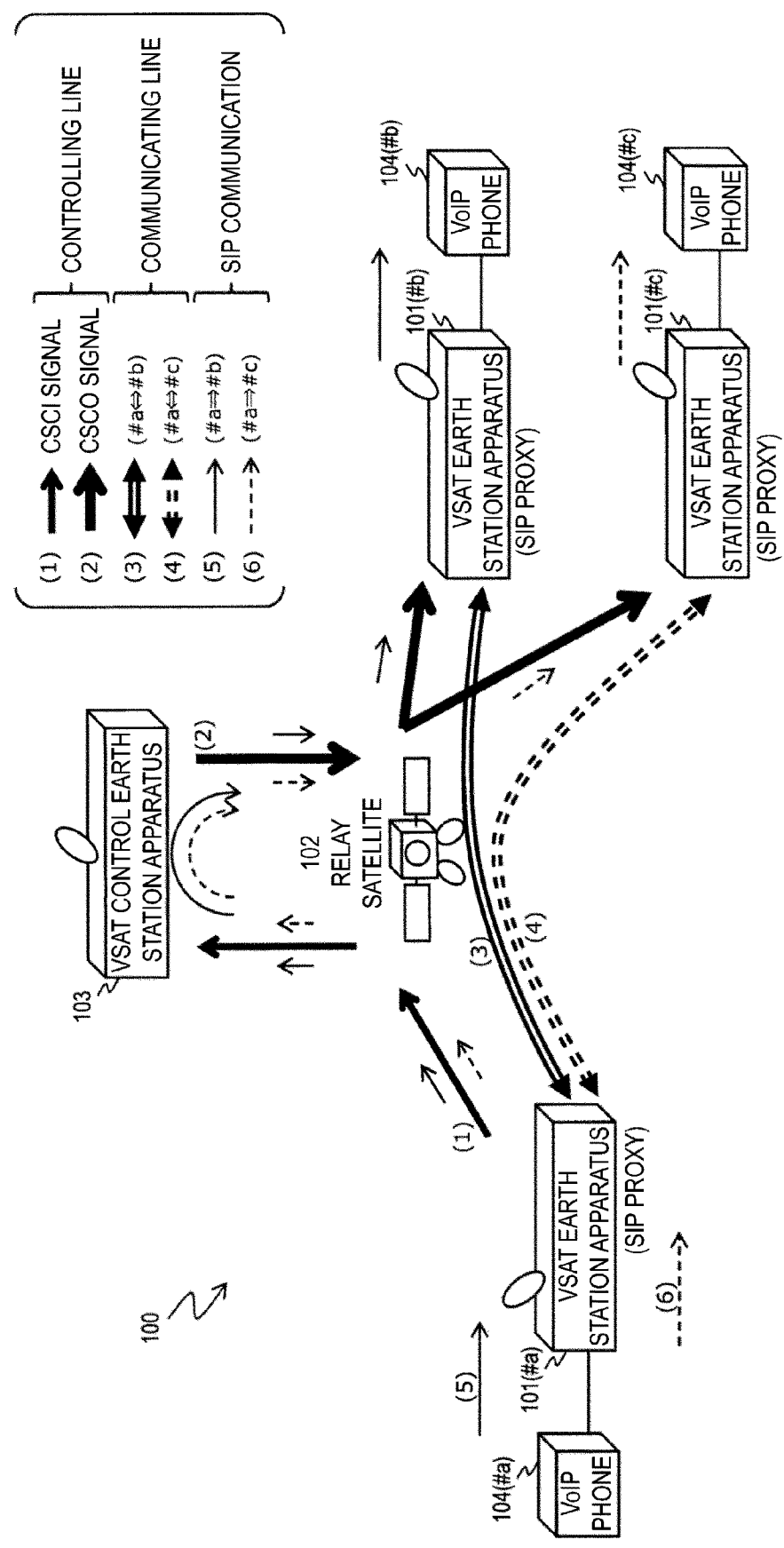
FIG. 1 is a diagram illustrating a configuration example of a VSAT system according to the present embodiment.

FIG. 1 is a diagram illustrating a configuration example of a VSAT system 100 according to the present embodiment. In FIG. 1, the VSAT system 100 constitutes a satellite communication system, and includes a VSAT earth station apparatus 101 (#a), a VSAT earth station apparatus 101 (#b), a VSAT earth station apparatus 101 (#c), a relay satellite 102, a VSAT control earth station apparatus 103, a VoIP phone 104 (#a), a VoIP phone 104 (#b), and a VoIP phone 104 (#c). Here, in the case of a description common to the VSAT earth station apparatus 101 (#a), the VSAT earth station apparatus 101 (#b), and the VSAT earth station apparatus 101 (#c), an alphabet suffixed to the reference sign (#alphabet) is omitted and the VSAT earth station apparatus 101 is referred to. In a case of referring to a specific VSAT earth station apparatus 101, for example, the VSAT earth station apparatus 101 (#a) is referred to. The VoIP phone 104 is also similarly referred to. In FIG. 1, a medium-thick line arrow of (1) indicates a control signal (CSCI signal) transmitted over a controlling line (corresponding to a CSC line) from the VSAT earth station apparatus 101 to the VSAT control earth station apparatus 103, and an extra-thick line arrow of (2) indicates a control signal (CSC signal (CSCI signal or CSCO signal)) transmitted from the VSAT control earth station apparatus 103 to the VSAT earth station apparatus 101. A double-lined arrow of (3) indicates a communicating line between the VSAT earth station apparatus 101 (#a) and the VSAT earth station apparatus 101 (#b) which are single hop connected, and a double-lined dashed arrow of (4) indicates a communicating line between the VSAT earth station apparatus 101 (#a) and the VSAT earth station apparatus 101 (#c) which are single hop connected. In addition, a thine line arrow of (5) indicates a SIP communication from the VoIP phone 104 (#a) to the VoIP phone 104 (#b), and a thin line dashed arrow of (6) indicates a SIP communication from the VoIP phone 104 (#a) to the VoIP phone 104 (#c).

Here, the VSAT earth station apparatus 101, which has a function of a SIP proxy server, encapsulates a predetermined SIP packet in a CSCI signal and transmits the encapsulated resultant via the relay satellite 102 to the VSAT control earth station apparatus 103. The VSAT control earth station apparatus 103 converts the CSCI signal encapsulated with the SIP packet into a CSCO signal and transmits the converted resultant to the VSAT earth station apparatus 101 that is a transmission destination. Then, the VSAT earth station apparatus 101 receiving the CSCO signal encapsulated with the SIP packet from the VSAT control earth station apparatus 103 extracts the SIP packet and outputs the extracted SIP packet to the VoIP phone 104.

In this way, in the VSAT system 100 according to the present embodiment, the VSAT earth station apparatus 101 has the function of the SIP proxy server and has the function to encapsulate, in the CSC signal, the SIP packet to be transmitted and/or received by the VoIP phone 104, and thus, the SIP packet can be transmitted and/or received between the VoIP phones 104 accommodated by the VSAT earth station apparatus 101.

In the example of FIG. 1, it is assumed that, among three VSAT earth station apparatuses 101, the VoIP phone 104 (#a) of the VSAT earth station apparatus 101 (#a) is on the outgoing side, and the VSAT earth station apparatus 101 (#b) and the VSAT earth station apparatus 101 (#c) are on the incoming side. Here, the VSAT earth station apparatus 101 (#a) corresponds to a first earth station apparatus, the VoIP phone 104 (#a) corresponds to a first terminal apparatus, the VSAT earth station apparatus 101 (#b) corresponds to a second earth station apparatus, and the VSAT earth station apparatus 101 (#c) corresponds to a second terminal apparatus.

First, the VoIP phone 104 (#a) transmits a control message ("INVITE method") for a SIP packet for communicating on a communicating line between the VoIP phone 104 (#a) and the VoIP phone 104 (#b) (arrow (5)). Here, in the following description, a method such as "INVITE method" or "BYE method" and a response code such as "180 Ringing" or "100 Trying" are collectively referred to as a control message.

Here, the VSAT earth station apparatus 101 according to the present embodiment needs to adjust a reception frequency to a transmission frequency of the VSAT earth station apparatus 101 that is a communication destination because the transmission frequency for the communicating line is predetermined by the transmission frequency fixed assignment scheme. As such, a transmission frequency mapping table is pre-provided in each of the VSAT earth station apparatuses 101, in which identification information (e.g., apparatus names, domain names, and the like) of all the VSAT earth station apparatuses 101 in the VSAT system 100 is associated with the transmission frequencies used by the apparatuses.

In FIG. 1, the VSAT earth station apparatus 101 (#a) refers to the transmission frequency mapping table in accordance with information of the VSAT earth station apparatus 101 (#b) accommodating the VoIP phone 104 (#b) that is a transmission destination of the SIP packet transmitted by the VoIP phone 104 (#a) to acquire the transmission frequency for the communicating line of the VSAT earth station apparatus 101 (#b), and then, changes, to the acquired transmission frequency, the reception frequency for the communicating line of the apparatus 101 (#a) itself. Similarly, the VSAT earth station apparatus 101 (#b), in accordance with information of the VSAT earth station apparatus 101 (#a) accommodating the VoIP phone 104 (#a) that is a transmission destination of the SIP packet transmitted from the VoIP phone 104 (#b) to the VoIP phone 104 (#a), acquires the transmission frequency for the communicating line of the VSAT earth station apparatus 101 (#a), and changes, to the acquired transmission frequency, the reception frequency for the communicating line of the apparatus 101 (#b) itself.

In this manner, a communicating line (arrow (3)) is connected between the VSAT earth station apparatus 101 (#a) and the VSAT earth station apparatus 101 (#b).

In a case that the communicating line between the VSAT earth station apparatus 101 (#a) and the VSAT earth station apparatus 101 (#b) is line-switched to a communicating line between the VSAT earth station apparatus 101 (#a) and the VSAT earth station apparatus 101 (#c), the VoIP phone 104 (#a) performs SIP communication with the VoIP phone 104 (#c) (arrow (6)). Similar to the above-described connection process of the communicating line between the VSAT earth station apparatus 101 (#a) and the VSAT earth station apparatus 101 (#b), the reception frequency for the communicating line of the VSAT earth station apparatus 101 (#a) is changed to a transmission frequency of the VSAT earth station apparatus 101 (#c), and a reception frequency of the VSAT earth station apparatus 101 (#c) is changed to the transmission frequency of the VSAT earth station apparatus 101 (#a), and thus, a communicating line (arrow (4)) is connected between the VSAT earth station apparatus 101 (#a) and the VSAT earth station apparatus 101 (#c).

In this manner, the VSAT system 100 according to the present embodiment can perform circuit-switching of the communicating line between the VSAT earth station apparatuses 101 that are single-hop connected in a satellite channel using a simple transmission frequency fixed assignment scheme.

Figure 2:
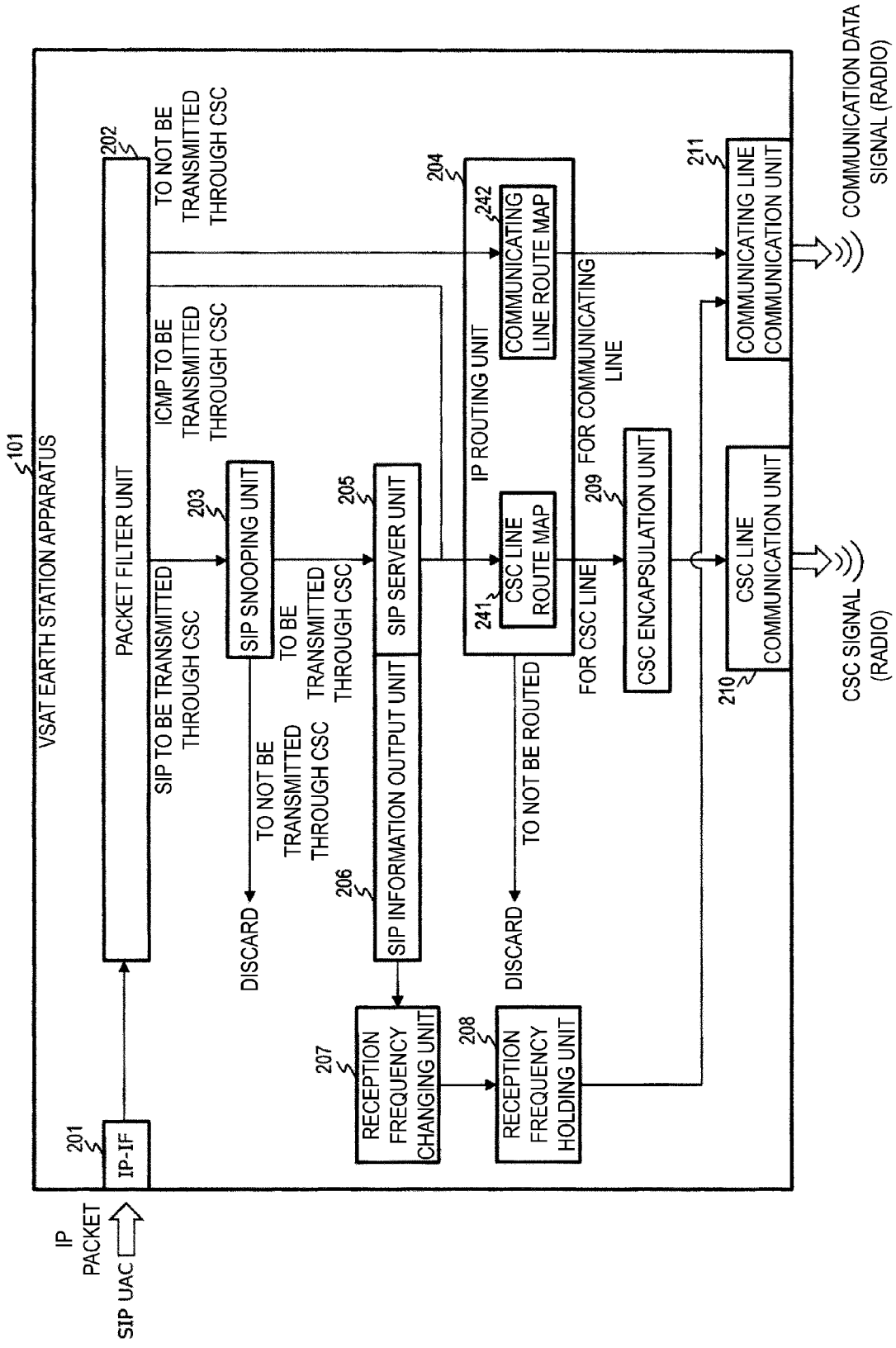
FIG. 2 is a diagram illustrating an example of functional blocks in a VSAT earth station apparatus on an outgoing side.

FIG. 2 is a diagram illustrating an example of functional blocks in the VSAT earth station apparatus 101 on the outgoing side. In FIG. 2, the VSAT earth station apparatus 101 includes an IP-IF 201, a packet filter unit 202 for IP packet to be encapsulated in CSC signal, a SIP snooping unit 203, an IP routing unit 204, a SIP server unit 205, a SIP information output unit 206 that outputs SIP transaction information, a reception frequency changing unit 207 for a communicating line, a reception frequency holding unit 208 for a communicating line, an CSC encapsulation unit 209 of an IP packet, a CSC line communication unit 210 for transmission and reception on a CSC line, and a communicating line communication unit 211 for transmission and reception on a communicating line.

The IP-IF 201 is an interface for inputting IP packets from a SIP_UAC (SIP-enabled terminal apparatus) such as the VoIP phone 104.

The packet filter unit 202 determines whether the IP packet the IP-IF 201 inputs is an IP packet of SIP to be transmitted through CSC, an IP packet of ICMP to be transmitted through CSC, or an IP packet to not be transmitted through CSC. Then, the packet filter unit 202 outputs the IP packet to the SIP snooping unit 203 in a case that the IP packet is the SIP packet to be transmitted through CSC, and outputs the IP packet to the IP routing unit 204 in the case that the IP packet is the ICMP IP packet to be transmitted through CSC or the IP packet to not be transmitted through CSC, in accordance with a preset filter condition. The filter condition will be described later in detail.

The SIP snooping unit 203 determines whether the SIP packet is to be transmitted through CSC or to not be transmitted through CSC in accordance with a preset SIP transparent transmission condition. The SIP snooping unit 203 outputs the SIP packet to the SIP server unit 205 in a case that the SIP packet is to be transmitted through CSC, and discards the SIP packet in a case that the SIP packet is to not be transmitted through CSC. The SIP transparent transmission condition will be described later in detail.

The IP routing unit 204 performs routing in accordance with a transmission destination of the SIP packet output from the SIP server unit 205, or the ICMP packet to be transmitted through CSC or the IP packet to not be transmitted through CSC output from the packet filter unit 202. Here, the IP routing unit 204 includes a CSC line route map 241 and a communicating line route map 242. The CSC line route map 241 holds a routing map of the IP packet to be transmitted on the CSC line, and the IP routing unit 204 references the CSC line route map 241 to configure a transfer destination of the IP packet to be transmitted on the CSC line. Similarly, the communicating line route map 242 holds a routing map of the IP packet to be transmitted on the communicating line, and the IP routing unit 204 references the communicating line route map 242 to configure a transfer destination of the IP packet to be transmitted on the communicating line.

The SIP server unit 205 functions as a SIP proxy server that performs SIP transaction processing as described for the related art, and receives a SIP packet such as the "INVITE method" and outputs the SIP packet to the IP routing unit 204 and the SIP information output unit 206.

The SIP information output unit 206, which has a function to output the SIP transaction information, extracts transmission source information, transmission destination information, a Call-ID (information for identifying a session), and the like of the control message (e.g., "INVITE method", "ACK method", and the like) for the SIP packet received by the SIP server unit 205, and outputs the extracted information to the reception frequency changing unit 207.

The reception frequency changing unit 207 has the predetermined table for setting the transmission frequency for the communicating line (transmission frequency mapping table) of each of the VSAT earth station apparatuses 101. The reception frequency changing unit 207 references the transmission frequency mapping table to acquire the transmission frequency for the communicating line of the VSAT earth station apparatus 101 that is a transmission destination corresponding to a domain name output by the SIP information output unit 206. The reception frequency changing unit 207 changes the reception frequency for the communicating line of the apparatus itself to the acquired transmission frequency. The reception frequency changing unit 207 sets a reception frequency standby timer to a predetermined wait time and starts the timer. The reception frequency standby timer is a timer for waiting during a prescribed period of time until an initiation of communication (media session) in a state in which the reception frequency is set, and in case that the initiation of the communication is not confirmed even after the prescribed period of time elapses (for example, in a case that the "ACK method" corresponding to the "INVITE method" cannot be confirmed), or the "BYE method" (or a "CANCEL method") is confirmed, the reception frequency setting is released. This can prevent the reception frequency from being remained set in a case that the VoIP phone 104 discontinues partway, or a fault or the like occurs. After the initiation of the communication is confirmed, the reception frequency changing unit 207 executes, with respect to the reception frequency holding unit 208, a reception frequency hold command for holding the reception frequency setting, a reception frequency hold release command for releasing the reception frequency setting, or the like to start or stop a reception frequency holding timer, set or reset a timer value, and so on, in accordance with the transmission source information, the transmission destination information, the Call-ID, and the like of the control message for the SIP packet output from the SIP information output unit 206.

The reception frequency holding unit 208 starts the reception frequency holding timer in response to the reception frequency hold command executed by the reception frequency changing unit 207. The reception frequency holding timer is a timer of a prescribed period of time for holding the reception frequency during communication on the communicating line and is reset in accordance with the "INVITE method" or the like that is periodically received from the VoIP phone 104 within the prescribed period of time. For example, in a case that the periodic control message is not confirmed within the prescribed period of time due to a failure or the like, or in a case that the "BYE method" (or the "CANCEL method") is confirmed, the reception frequency changing unit 207 and the reception frequency holding unit 208 release the reception frequency setting.

The CSC encapsulation unit 209 encapsulates the SIP packet transmitted by the SIP server unit 205 in the CSCI signal, and outputs the encapsulated SIP packet to the CSC line communication unit 210.

The CSC line communication unit 210 transmits the SIP packet encapsulated by the CSC encapsulation unit 209 in the CSCI signal to the VSAT control earth station apparatus 103 via the relay satellite 102.

The communicating line communication unit 211 transmits an IP packet of the communication data of the outgoing side VoIP phone 104 output from IP routing unit 204 (e.g., Realtime Transport Protocol (RTP) packet) to the incoming side VSAT earth station apparatus 101 by way of the single hop connection via the relay satellite 102 at a fixed transmission frequency predetermined for each of the VSAT earth station apparatuses 101.

In this manner, the outgoing side VSAT earth station apparatus 101 may acquire, in accordance with the information of the SIP packet transmitted by the VoIP phone 104 in calling, the transmission frequency for the communicating line of the VSAT earth station apparatus 101 accommodating VoIP phone 104 on the incoming side, and set the reception frequency to be the same as the acquired transmission frequency to perform the communication.

Figure 3:
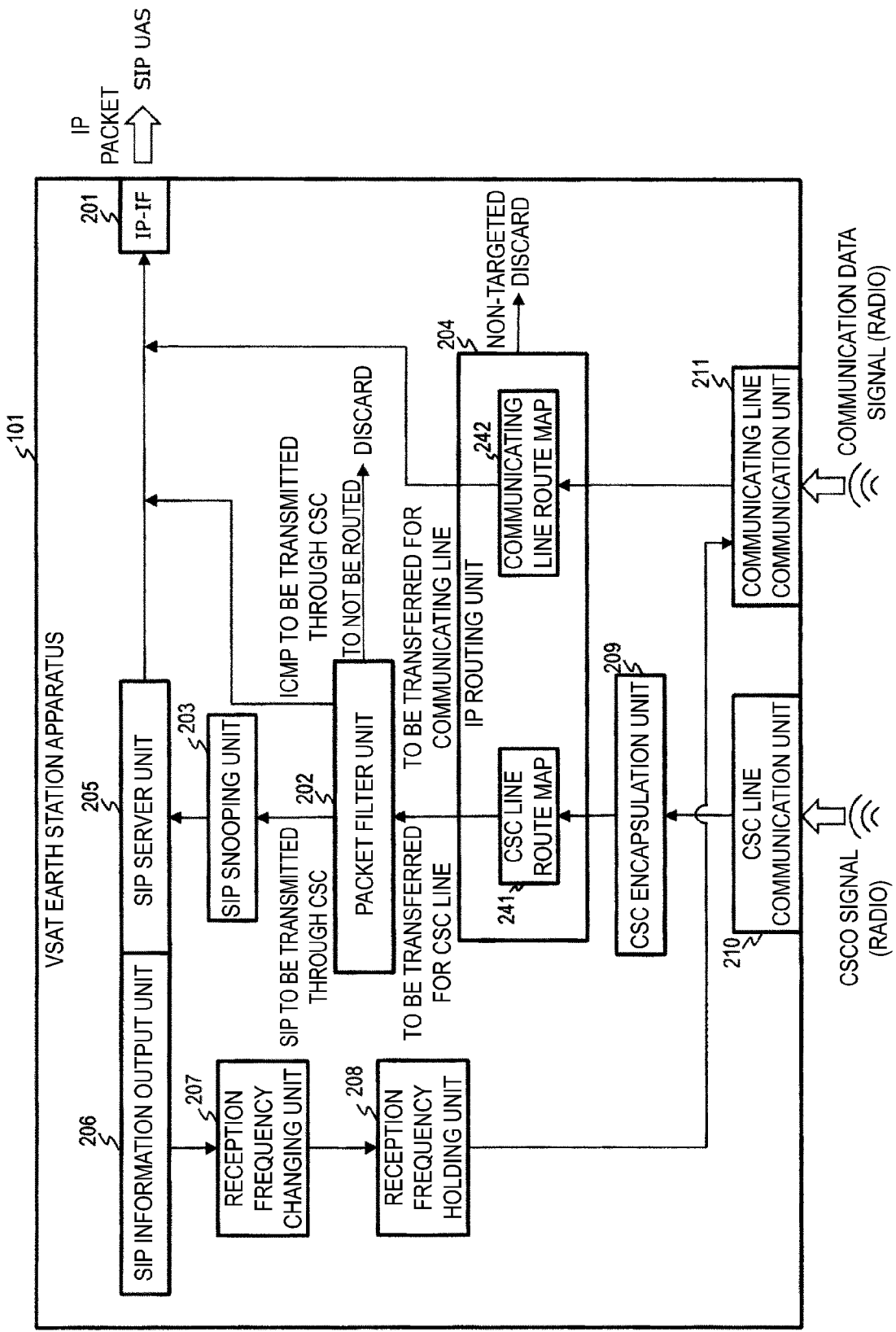
FIG. 3 is a diagram illustrating an example of functional blocks in a VSAT earth station apparatus on an incoming side.

FIG. 3 is a diagram illustrating an example of functional blocks in the VSAT earth station apparatus 101 on the incoming side. Note that the respective functional blocks in FIG. 3 essentially perform the operations the same as the functional blocks described in FIG. 2 and denoted by the same reference signs. Hereinafter, a flow of the signal and the IP packet on the incoming side will be described.

The CSC line communication unit 210 receives, via the relay satellite 102, a CSCO signal in which the SIP packet is encapsulated and which is transmitted from the VSAT control earth station apparatus 103.

The communicating line communication unit 211 receives the IP packet of the communication data transmitted from the outgoing side VSAT earth station apparatus 101 by way of the single hop connection via the relay satellite 102 on the communicating line at the reception frequency set by the reception frequency changing unit 207 and the reception frequency holding unit 208, and outputs the received data to the IP routing unit 204.

The CSC encapsulation unit 209 de-encapsulates the encapsulation of the CSCO signal in which the IP packet is encapsulated and which is received by the CSC line communication unit 210. Then, the CSC encapsulation unit 209 decodes the IP packet and outputs the decoded IP packet to the IP routing unit 204.

The IP routing unit 204 performs routing depending on transmission destinations of the IP packet output from the CSC encapsulation unit 209 and the IP packet of the communication data output from the communicating line communication unit 211. Note that, in the routing, similar to FIG. 2, the routing maps of the CSC line route map 241 and the communicating line route map 242 are referenced to configure the transfer destination of the IP packet. For example, the IP routing unit 204 outputs the IP packet of the communication data to be transferred for the communicating line to the IP-IF 201 and outputs the IP packet to be transferred for the CSC line to the packet filter unit 202, and discards the IP packet for none of the both that is not to be transferred.

The packet filter unit 202 determines whether the IP packet to be transferred for the CSC line that is output from the IP routing unit 204 is an IP packet of SIP to be transmitted through CSC, an IP packet of ICMP to be transmitted through CSC, or an IP packet to not be transmitted through CSC. Then, the packet filter unit 202 outputs the IP packet to the SIP snooping unit 203 in the case that the IP packet is the SIP packet to be transmitted through CSC, outputs the IP packet to the IP-IF 201 in the case that the IP packet is the ICMP packet to be transmitted through CSC, or discards the IP packet in a case that the IP packet is neither the SIP packet to be transmitted through CSC nor the ICMP packet to be transmitted through CSC, in accordance with the preset filter condition.

The SIP snooping unit 203 snoops the SIP packet to be transmitted through CSC, the SIP packet being output by the packet filter unit 202, and outputs the snooped resultant to the SIP server unit 205. Note that the IP packet to not be transmitted through CSC is discarded in the SIP snooping unit 203 on the outgoing side in FIG. 2, and therefore, there is no IP packet to be discarded on the incoming side.

The SIP server unit 205 receives the SIP packet of the "INVITE method", the response code "180 Ringing", or the like, and outputs the received SIP packet to the IP-IF 201 and the SIP information output unit 206.

The SIP information output unit 206, which has the function to output the SIP transaction information, extracts the transmission source information, the transmission destination information, the Call-ID, and the like of the SIP packet (e.g., the "INVITE method", "ACK method", and the like) received by the SIP server unit 205, and outputs the extracted information to the reception frequency changing unit 207.

The reception frequency changing unit 207 basically operates in the same manner as the outgoing side illustrated in FIG. 2, however, in the case of the incoming side, the reception frequency changing unit 207 holds the transmission source information, the transmission destination information, the Call-ID, and the like of, for example, the "INVITE method" received from the outgoing side, and compares with transmission source information, transmission destination information, and Call-ID of the response code "180 Ringing" returned from the incoming side VoIP phone 104 to the outgoing side VoIP phone 104 to confirm whether the response code "180 Ringing" corresponds to the previously received "INVITE method". This enables the determination whether the response code "180 Ringing" corresponds to the "INVITE method" even in a situation where a plurality of "INVITE methods" are received temporally closely, and thus, the reception frequency of the apparatus itself can be surely changed to the transmission frequency of the VSAT earth station apparatus 101 as the communications partner that is to be connected on the communicating line.

The reception frequency holding unit 208 basically operates in the same manner as the outgoing side illustrated in FIG. 2, and controls the reception frequency holding timer in response to the reception frequency hold command executed by the reception frequency changing unit 207.

The IP-IF 201 is an interface for outputting each of the IP packets output from the SIP server unit 205, the packet filter unit 202, and the IP routing unit 204 to the SIP_UAS (SIP-enabled terminal apparatus) such as the incoming side VoIP phone 104.

In this manner, the VSAT earth station apparatus 101 accommodating the VoIP phone 104 on the incoming side may acquire, in accordance with the information of the SIP packet transmitted by the outgoing side VoIP phone 104, the transmission frequency for the communicating line of the VSAT earth station apparatus 101 accommodating the VoIP phone 104 on the outgoing side, and change the reception frequency to be the same as the acquired transmission frequency to perform the communication on the communicating line.

Figure 4:
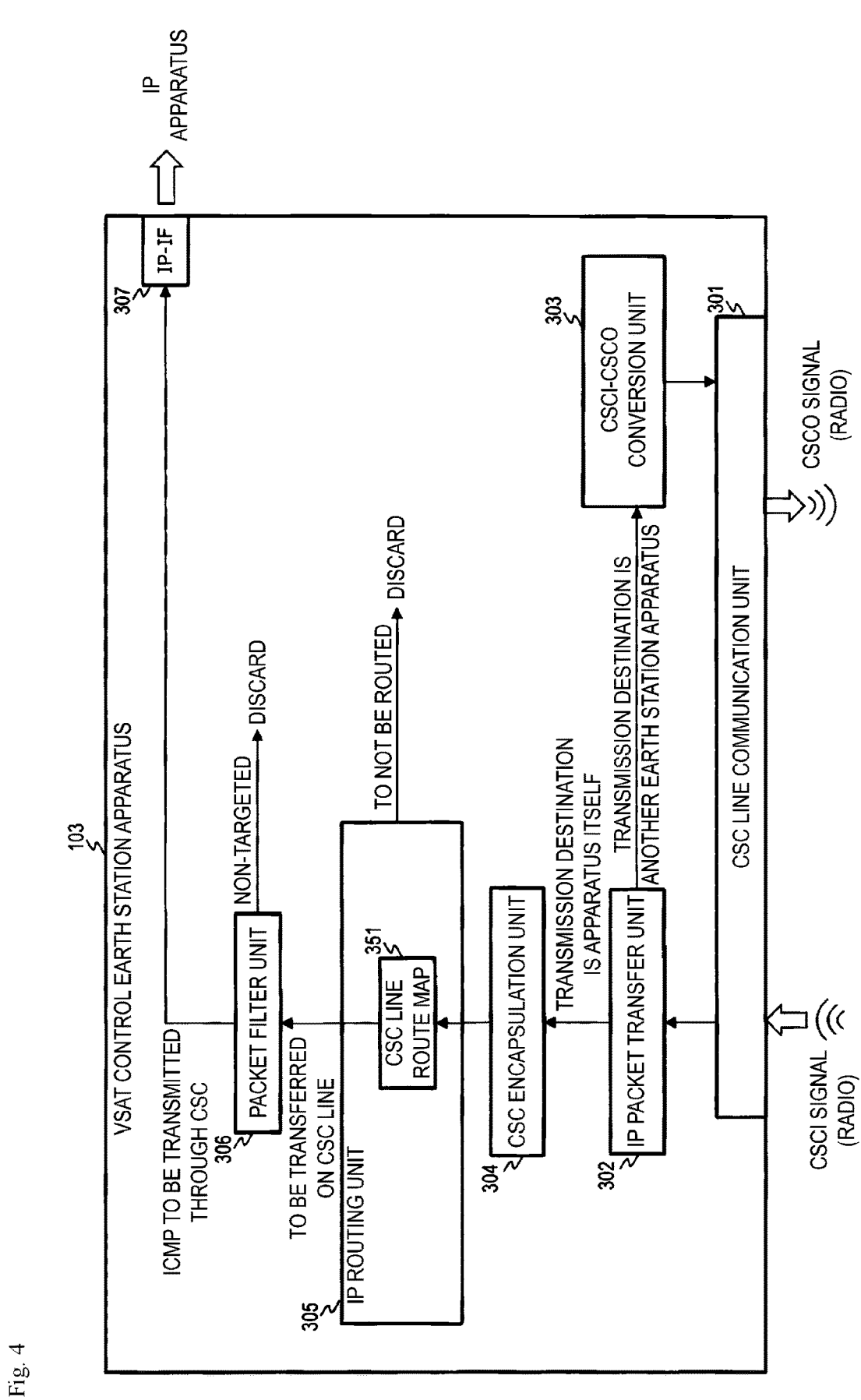
FIG. 4 is a diagram illustrating an example of a functional block diagram of a VSAT control earth station apparatus.

FIG. 4 is a diagram illustrating an example of a functional block diagram of the VSAT control earth station apparatus 103. In FIG. 4, the VSAT control earth station apparatus 103 includes a CSC line communication unit 301, an IP packet transfer unit 302, a CSCI-CSCO conversion unit 303, a CSC encapsulation unit 304, an IP routing unit 305, a packet filter unit 306, and an IP-IF 307.

The CSC line communication unit 301 transmits and receives the CSC signal on the CSC line. The CSC line communication unit 301 receives the CSCI signal in which the IP packet is encapsulated from the VSAT earth station apparatus 101 that is the transmission source and transmits the CSCO signal in which the IP packet is encapsulated to the VSAT earth station apparatus 101 that is the transmission destination. Note that the CSCI signal and the CSCO signal are transmitted or received in a dedicated frequency bands different from each other. The CSCO signal is broadcast from the VSAT control earth station apparatus 103 to the all VSAT earth station apparatuses 101, and is broadcast in a continuous signal occupying the CSCO carrier. The CSCI signal is transmitted in a burst signal for sharing the CSCI carrier between a plurality of VSAT earth station apparatuses 101 using time division and random time transmission.

The IP packet transfer unit 302 transfers the IP packet encapsulated in the CSC signal. The IP packet transfer unit 302 receives the CSCI signal in which the IP packet is encapsulated from the VSAT earth station apparatus 101, checks the control command of IP packet transfer and the ID of the VSAT earth station apparatus 101 to be the transmission destination of the IP packet, and outputs the IP packet to the CSC encapsulation unit 304 in a case that the transmission destination is the apparatus itself, or to the CSCI-CSCO conversion unit 303 in a case that the transmission destination is another VSAT earth station apparatus 101.

The CSCI-CSCO conversion unit 303 converts the IP packet encapsulated in the CSCI signal into an IP packet encapsulated in the CSCO signal. For example, the CSCI-CSCO conversion unit 303 converts and encapsulates the IP packet output from the IP packet transfer unit 302 into a CSCO signal directed to the ID of the VSAT earth station apparatus 101 as the transmission destination, and outputs the resulting IP packet to the CSC line communication unit 301.

The CSC encapsulation unit 304 releases the encapsulation of the CSCI signal in which the IP packet, that is to be output by the IP packet transfer unit 302 and to be transmitted to the apparatus itself, is encapsulated. Then, the CSC encapsulation unit 304 decodes the IP packet and outputs the decoded IP packet to the IP routing unit 305.

The IP routing unit 305 performs routing depending on transmission destinations of the IP packet output from the CSC encapsulation unit 304. Note that, in the routing, similar to FIG. 2, the routing map of the CSC line route map 351 is referenced to determine the transfer destination of the IP packet. For example, the IP routing unit 305 outputs the IP packet to be transferred for the CSC line to the packet filter unit 306, and discards the IP packet not to be transferred for the CSC line.

The packet filter unit 306 determines whether the IP packet to be transferred for the CSC line that is output from the IP routing unit 305 is an IP packet of ICMP to be transmitted through CSC or an IP packet to not be transmitted through CSC. Then, the packet filter unit 306 outputs the IP packet to the IP-IF 307 in the case that the IP packet is the ICMP IP packet to be transmitted through CSC, or discards the IP packet in the case that the IP packet is neither the ICMP IP packet to be transmitted through CSC nor the IP packet to not be transmitted through CSC.

The IP-IF 307 is output to an IP apparatus (such as a network router) connected to the VSAT control earth station apparatus 103 and transferred to a network such as the Internet, for example.

In this manner, the VSAT control earth station apparatus 103 according to the present embodiment can transfer the IP packet encapsulated in the CSC signal that is transmitted and/or received between the VSAT earth station apparatuses 101 in the identical VSAT system 100.

Figure 5:
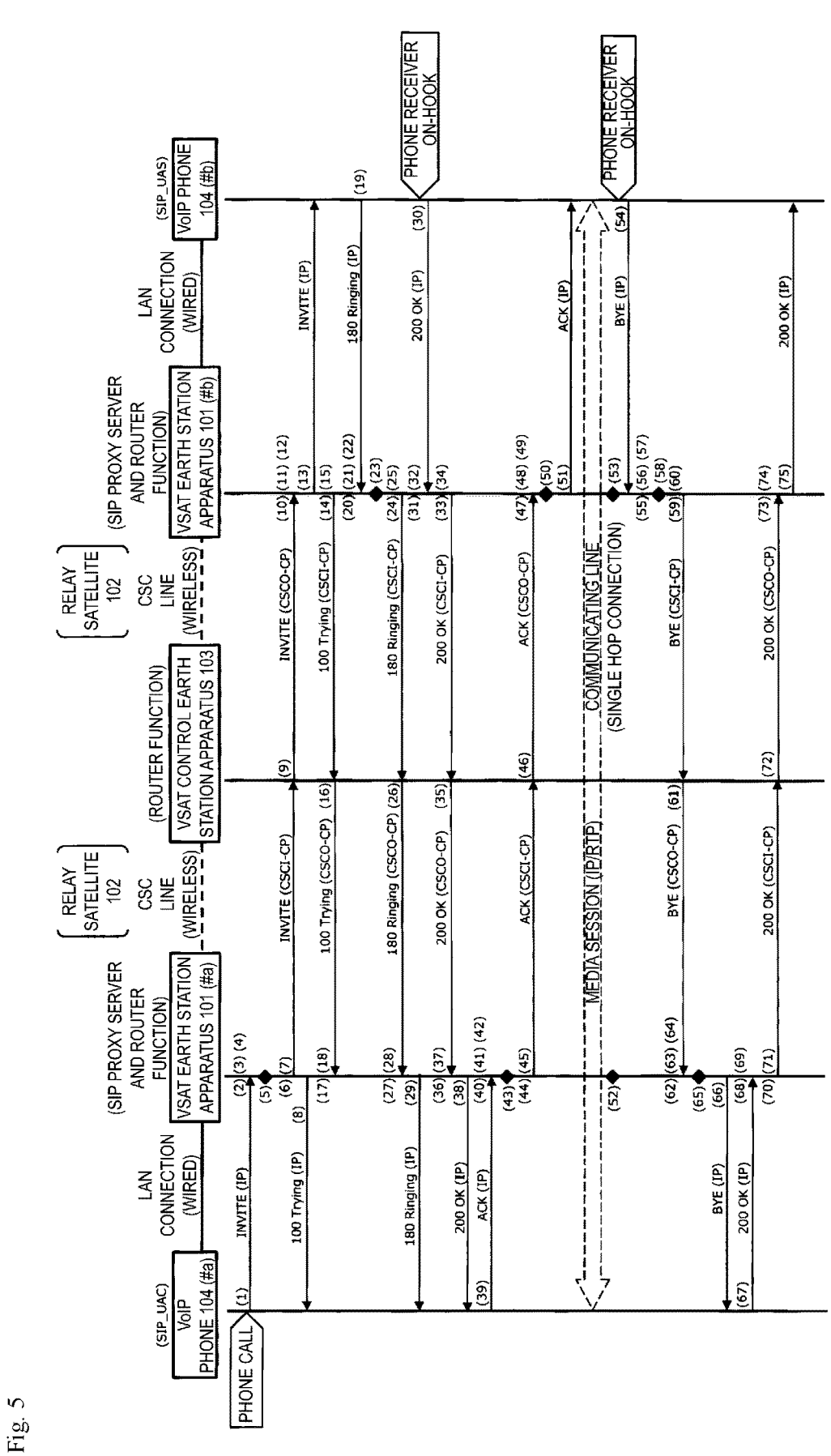
FIG. 5 is a diagram illustrating an example of a connection sequence of the VSAT system according to the present embodiment.

FIG. 5 is a diagram illustrating an example of a connection sequence of the VSAT system 100 according to the present embodiment. Here, FIG. 5 illustrates a flow of processing in the case of establishing a communicating line to perform communication in the single hop connection via the relay satellite 102 between the VSAT earth station apparatus 101 (#a) accommodating the VoIP phone 104 (#a) on the outgoing side and the VSAT earth station apparatus 101 (#b) accommodating the VoIP phone 104 (#b) on the incoming side. These processes are performed by the function blocks described in FIGS. 2, 3, and 4. Note that in FIG. 5, "(numeral)" indicates a processing step.

In step (1), when a user performs a calling operation (operation of off-hook dialing) on the VoIP phone 104 (#a) of the SIP_UAC, the VoIP phone 104 (#a) outputs an IP packet that is a SIP packet "INVITE method" for the VoIP phone 104 (#b) to the VSAT earth station apparatus 101 (#a) functioning as a SIP proxy server and a router.

In step (2), concerning the IP packet input from the IP-IF 201 of the VSAT earth station apparatus 101 (#a), the packet filter unit 202 extracts a SIP packet or ICMP packet that matches the preset filter condition. Here, a SIP packet ("INVITE method") is extracted.

In step (3), concerning the SIP packet ("INVITE method") extracted in the previous step, the SIP snooping unit 203 transfers a SIP packet matching the preset SIP transparent transmission condition to the SIP server unit 205 included in the VSAT earth station apparatus 101 (#a).

In step (4), the SIP information output unit 206 extracts transmission source information, transmission destination information, and a Call-ID of the SIP packet ("INVITE method") received by the SIP server unit 205, and outputs the extracted information to the reception frequency changing unit 207.

In step (5), the reception frequency changing unit 207 acquires a transmission frequency of the VSAT earth station apparatus 101 (#b) accommodating the VoIP phone 104 (#b) that is the transmission destination, with reference to the transmission frequency mapping table. The reception frequency changing unit 207 changes a reception frequency for a communicating line of the apparatus itself (that is the VSAT earth station apparatus 101 (#a)) to the transmission frequency of the VSAT earth station apparatus 101 (#b), and starts the reception frequency standby timer.

In step (6), the SIP server unit 205 of the VSAT earth station apparatus 101 (#a), having the function of the SIP proxy server, receiving the "INVITE method" confirms a URI location of the transmission destination and transmits the "INVITE method" via the IP routing unit 204.

In step (7), the CSC encapsulation unit 209 of the VSAT earth station apparatus 101 (#a) encapsulates the SIP packet ("INVITE method") output by the SIP server unit 205 in a CSCI signal and transmits the encapsulated SIP packet to the VSAT control earth station apparatus 103 on the CSCI line.

In step (8), the SIP server unit 205 of the VSAT earth station apparatus 101 (#a) outputs a response code "100 Trying" to the SIP_UAC of the VoIP phone 104 (#a).

In step (9), the IP packet transfer unit 302 of the VSAT control earth station apparatus 103 receives the CSCI signal in which the IP packet ("INVITE method") is encapsulated, and outputs a signal of which the transmission destination is another VSAT earth station apparatus 101 to the CSCI-CSCO conversion unit 303 in accordance with the control command of IP packet transfer and the IP transmission destination earth station apparatus ID. The CSCI-CSCO conversion unit 303 encapsulates and converts the CSCI signal in which the IP packet ("INVITE method") is encapsulated into a CSCO signal to be directed to the IP transmission destination earth station apparatus ID (for example, the VSAT earth station apparatus 101 (#b)), and transmits the encapsulated and converted CSCO signal to the VSAT earth station apparatus 101 (#b) on the CSCO line.

In step (10), the CSC encapsulation unit 209 of the incoming side VSAT earth station apparatus 101 (#b) receiving the CSCO signal in which the IP packet is encapsulated releases the encapsulation of the IP packet, decodes the IP packet, and extracts a SIP packet or ICMP packet that matches the filter condition of the packet filter unit 202. Here, a SIP packet ("INVITE method") is extracted.

In step (11), the SIP packet ("INVITE method") extracted in the previous step is transferred to the SIP server unit 205 of the VSAT earth station apparatus 101 (#b).

In step (12), the SIP information output unit 206 of the VSAT earth station apparatus 101 (#b) extracts the transmission source information and the Call-ID of the "INVITE method" received by the SIP server unit 205, and outputs the extracted information to the reception frequency changing unit 207.

In step (13), the SIP server unit 205 of the VSAT earth station apparatus 101 (#b) outputs the "INVITE method" from the IP-IF 201 to the SIP_UAS of the VoIP phone 104 (#b).

In step (14), the SIP server unit 205 of the VSAT earth station apparatus 101 (#b) outputs the response code "100 Trying" to the CSC encapsulation unit 209.

In step (15), the CSC encapsulation unit 209 of the VSAT earth station apparatus 101 (#b) encapsulates the SIP packet (response code "100 Trying") output by the SIP server unit 205 in a CSCI signal and transmits the encapsulated SIP packet to the VSAT control earth station apparatus 103 on the CSCI line.

In step (16), the VSAT control earth station apparatus 103 receives the CSCI signal in which the IP packet (response code "100 Trying") is encapsulated and which is transmitted from the VSAT earth station apparatus 101 (#b). Then, the IP packet transfer unit 302 outputs a signal of which the transmission destination is another VSAT earth station apparatus 101 to the CSCI-CSCO conversion unit 303 in accordance with the control command of IP packet transfer and the IP transmission destination earth station apparatus ID. The CSCI-CSCO conversion unit 303 encapsulates and converts the CSCI signal in which the IP packet (response code "100 Trying") is encapsulated into a CSCO signal to be directed to the IP transmission destination earth station apparatus ID (for example, the VSAT earth station apparatus 101 (#a)), and transmits the encapsulated and converted CSCO signal to the VSAT earth station apparatus 101 (#a) on the CSCO line.

In step (17), the CSC encapsulation unit 209 of the incoming side VSAT earth station apparatus 101 (#a) receiving the CSCO signal in which the IP packet is encapsulated releases the encapsulation of the IP packet, decodes the IP packet, and extracts a SIP packet or ICMP packet that matches the filter condition of the packet filter unit 202. Here, a SIP packet (response code "100 Trying") is extracted.

In step (18), the CSC encapsulation unit 209 outputs the SIP packet (response code "100 Trying") extracted in the previous step to the SIP server unit 205 of the VSAT earth station apparatus 101 (#a).

In step (19), the VoIP phone 104 (#b) of the SIP_UAS receiving the "INVITE method" in step (13) outputs the response code "180 Ringing" to the SIP server unit 205 of the VSAT earth station apparatus 101 (#b).

In step (20), the packet filter unit 202 of the VSAT earth station apparatus 101 (#b) extracts, concerning the IP packet input by the IP-IF 201, a SIP packet or ICMP packet that more matches a preset packet condition for IP packet to be encapsulated in CSC signal. Here, a SIP packet (response code "180 Ringing") is extracted.

In step (21), the SIP snooping unit 203 snoops the SIP packet (response code "180 Ringing") extracted in the previous step, and outputs a SIP packet that more matches the preset SIP transparent transmission condition to the SIP server unit 205.

In step (22), the SIP information output unit 206 extracts the transmission destination information and the Call-ID of the response code "180 Ringing" received by the SIP server unit 205, and outputs the extracted information to the reception frequency changing unit 207.

In step (23), in a case that the transmission source information (VoIP phone 104 (#a)) and the Call-ID of the "INVITE method" extracted in (12) match the transmission destination information (VoIP phone 104 (#a) and the Call-ID of the response code "180 Ringing" extracted in the previous step, the reception frequency changing unit 207 acquires the transmission frequency of the VSAT earth station apparatus 101 (#a) accommodating the VoIP phone 104 (#a) that is the transmission source, with reference to the transmission frequency mapping table. The reception frequency changing unit 207 changes a reception frequency for a communicating line of the apparatus itself (that is the VSAT earth station apparatus 101 (#b)) to the transmission frequency of the VSAT earth station apparatus 101 (#a), and starts the reception frequency standby timer.

In step (24), the SIP server unit 205 of the VSAT earth station apparatus 101 (#b) outputs the response code "180 Ringing" to the VSAT earth station apparatus 101 (#a).

In step (25), the process similar to step (15) for the response code "100 Trying" is performed on the response code "180 Ringing".

In step (26), the process similar to step (16) for the response code "100 Trying" is performed on the response code "180 Ringing".

In step (27), the process similar to step (17) for the response code "100 Trying" is performed on the response code "180 Ringing".

In step (28), the process similar to step (18) for the response code "100 Trying" is performed on the response code "180 Ringing".

In step (29), the SIP server unit 205 of the VSAT earth station apparatus 101 (#a) outputs the response code "180 Ringing" to the SIP_UAC of the VoIP phone 104 (#a).

In step (30), the SIP_UAS of the VoIP phone 104 (#b) outputs a response code "200 OK" for the VoIP phone 104 (#a) to the SIP server unit 205 of the VSAT earth station apparatus 101 (#b) through an off-hook operation on a phone receiver by the user.

In step (31), the process similar to step (20) for the response code "180 Ringing" is performed on the response code "200 OK".

In step (32), the process similar to step (21) for the response code "180 Ringing" is performed on the response code "200 OK".

In step (33), the SIP server unit 205 of the VSAT earth station apparatus 101 (#b) transmits the response code "200 OK" to the VSAT earth station apparatus 101 (#a).

In step (34), the process similar to step (15) for the response code "180 Ringing" is performed on the response code "200 OK".

In step (35), the process similar to step (16) for the response code "180 Ringing" is performed on the response code "200 OK".

In step (36), the process similar to step (17) for the response code "180 Ringing" is performed on the response code "200 OK".

In step (37), the process similar to step (18) for the response code "180 Ringing" is performed on the response code "200 OK".

In step (38), the SIP server unit 205 of the VSAT earth station apparatus 101 (#a) outputs the response code "200 OK" to the SIP_UAC of the VoIP phone 104 (#a).

In step (39), the SIP_UAC of the VoIP phone 104 (#a) outputs the "ACK method" for the VoIP phone 104 (#b) to the SIP server unit 205 of the VSAT earth station apparatus 101 (#a).

In step (40), the process similar to step (2) for the "INVITE method" is performed on the "ACK method."

In step (41), the process similar to step (3) for the "INVITE method" is performed on the "ACK method."

In step (42), the SIP information output unit 206 of the VSAT earth station apparatus 101 (#a) extracts transmission source information and a Call-ID of the "ACK method" received by the SIP server unit 205, and outputs the extracted information to the reception frequency changing unit 207.

In step (43), in a case that the transmission source information and the Call-ID of the "INVITE method" extracted in step (4) match the transmission source information and the Call-ID of the "ACK method" extracted in step (42), the reception frequency changing unit 207 stops the reception frequency standby timer, resets the timer value and, executes the reception frequency hold command for the reception frequency holding unit 208 to start the reception frequency holding timer.

In step (44), the SIP server unit 205 of the VSAT earth station apparatus 101 (#a) transmits the "ACK method" to the VSAT earth station apparatus 101 (#b).

In step (45), the process similar to step (7) for the "INVITE method" is performed on the "ACK method."

In step (46), the process similar to step (9) for the "INVITE method" is performed on the "ACK method."

In step (47), the process similar to step (10) for the "INVITE method" is performed on the "ACK method."

In step (48), the process similar to step (11) for the "INVITE method" is performed on the "ACK method."

In step (49), the process similar to step (12) for the "INVITE method" is performed on the "ACK method."

In step (50), in a case that the transmission source information and the Call-ID of the "INVITE method" extracted in step (12) match the transmission source information and the Call-ID of the "ACK method" extracted in step (49), the reception frequency changing unit 207 stops the reception frequency standby timer, resets the timer value, and start execution of the reception frequency hold command for the reception frequency holding unit 208 and the reception frequency holding timer.

In step (51), the SIP server unit 205 of the VSAT earth station apparatus 101 (#b) outputs the "ACK method" to the VoIP phone 104 (#b) of the SIP_UAS.

Thereafter, a media session (communication by the RTP IP packet) is performed between the VoIP phone 104 (#a) and the VoIP phone 104 (#b) through the communicating line in the single hop connection established between the VSAT earth station apparatus 101 (#a) and the VSAT earth station apparatus 101 (#b). Note that in FIG. 5, the VSAT control earth station apparatus 103, which is passed through by a dotted arrow indicating the media session, is connected in the single hop connection between the VSAT earth station apparatus 101 (#a) and the VSAT earth station apparatus 101 (#b) via the relay satellite 102.

In step (52), the VSAT earth station apparatus 101 (#a) monitors the "INVITE method" that is periodically transmitted by the VoIP phone 104 (#a). Then, in a case that before the reception frequency holding timer times out, the VSAT earth station apparatus 101 (#a) receives the "INVITE method" matching the transmission source information and the Call-ID of the "INVITE method" extracted in (4), the VSAT earth station apparatus 101 (#a) resets the reception frequency holding timer.

In step (53), similar to step (52), the VSAT earth station apparatus 101 (#b) monitors the "INVITE method" that is periodically transmitted by the VoIP phone 104 (#a). Then, in a case that before the reception frequency holding timer times out, the VSAT earth station apparatus 101 (#b) receives the "INVITE method" matching the transmission source information and the Call-ID of the "INVITE method" extracted in (12), the VSAT earth station apparatus 101 (#b) resets the reception frequency holding timer.

In step (54), the SIP_UAS of the VoIP phone 104 (#b) outputs a "BYE method" to the SIP server unit 205 of the VSAT earth station apparatus 101 (#b) through an off-hook operation on the phone receiver by the user.

In step (55), the process similar to step (20) for the response code "180 Ringing" is performed on the "BYE method".

In step (56), the process similar to step (21) for the response code "180 Ringing" is performed on the "BYE method".

In step (57), the SIP information output unit 206 extracts transmission destination information and a Call-ID of the "BYE method" received by the SIP server unit 205, and outputs the extracted information to the reception frequency changing unit 207.

In step (58), in a case that the transmission source information and the Call-ID of the "INVITE method" extracted in step (12) match the transmission destination information and the Call-ID of the "BYE method" extracted in step (57), the reception frequency changing unit 207 executes the reception frequency hold release command for the reception frequency holding unit 208 to stop the reception frequency holding timer and reset the timer value.

In step (59), the SIP server unit 205 of the VSAT earth station apparatus 101 (#b) transmits the "BYE method" to the VSAT earth station apparatus 101 (#a).

In step (60), the process similar to step (15) for the response code "100 Trying" is performed on the "BYE method".

In step (61), the process similar to step (16) for the response code "100 Trying" is performed on the "BYE method".

In step (62), the process similar to step (17) for the response code "100 Trying" is performed on the "BYE method".

In step (63), the process similar to step (18) for the response code "100 Trying" is performed on the "BYE method".

In step (64), the SIP information output unit 206 of the VSAT earth station apparatus 101 (#a) extracts the transmission destination information and the Call-ID of the "BYE method" received by the SIP server unit 205, and outputs the extracted information to the reception frequency changing unit 207.

In step (65), in a case that the transmission source information and the Call-ID of the "INVITE method" extracted in step (4) match the transmission destination information and the Call-ID of the "BYE method" extracted in step (64), the reception frequency changing unit 207 executes the reception frequency hold release command for the reception frequency holding unit 208 to stop the reception frequency holding timer and reset the timer value.

In step (66), the SIP server unit 205 of the VSAT earth station apparatus 101 (#a) outputs the "BYE method" to the VoIP phone 104 (#a) of the SIP_UAC.

In step (67), the VoIP phone 104 (#a) outputs the response code "200 OK" to the SIP server unit 205 of the VSAT earth station apparatus 101 (#a).

In step (68), the process similar to step (2) for the "INVITE method" is performed on the response code "200 OK."

In step (69), the process similar to step (3) for the "INVITE method" is performed on the response code "200 OK."

In step (70), the SIP server unit 205 of the VSAT earth station apparatus 101 (#a) transmits the response code "200 OK" to the VSAT earth station apparatus 101 (#b).

In step (71), the process similar to step (7) for the "INVITE method" is performed on the response code "200 OK."

In step (72), the process similar to step (9) for the "INVITE method" is performed on the response code "200 OK."

In step (73), the process similar to step (10) for the "INVITE method" is performed on the response code "200 OK."

In step (74), the process similar to step (11) for the "INVITE method" is performed on the response code "200 OK."

In step (75), the SIP server unit 205 of the VSAT earth station apparatus 101 (#b) outputs the response code "200 OK" to the VoIP phone 104 (#b) of the SIP_UAS.

In this manner, the outgoing side VSAT earth station apparatus 101 (#a) acquires, in accordance with the information of the SIP packet ("INVITE method") transmitted by the VoIP phone 104 (#a) in calling, the transmission frequency for the communicating line of the VSAT earth station apparatus 101 (#b) accommodating the incoming side VoIP phone 104 (#b), and sets the reception frequency to be the same as the acquired transmission frequency. Similarly, the incoming side VSAT earth station apparatus 101 (#b) acquires, in accordance with the information of the SIP packet (response code "180 Ringing") returned by the VoIP phone 104 (#b), the transmission frequency for the communicating line of the VSAT earth station apparatus 101 (#a) accommodating the outgoing side VoIP phone 104 (#a), and sets the reception frequency to be the same as the acquired transmission frequency. This can establish the communicating line between the VSAT earth station apparatus 101 (#a) and the VSAT earth station apparatus 101 (#b) to perform communication.

Note that in a case that the VoIP phone 104 (#a) switches the line from the VoIP phone 104 (#b) to the VoIP phone 104 (#c), the sequence described in FIG. 5 can be performed on the VoIP phone 104 (#c) and the VSAT earth station apparatus 101 (#c) to establish a communicating line between the VSAT earth station apparatus 101 (#a) and the VSAT earth station apparatus 101 (#c) to perform communication.

In this manner, the VSAT system 100 according to the present embodiment can perform circuit-switching of the communicating line between the VSAT earth station apparatuses 101 that are single-hop connected in the satellite channel using the simple transmission frequency fixed assignment scheme.

Figure 6:
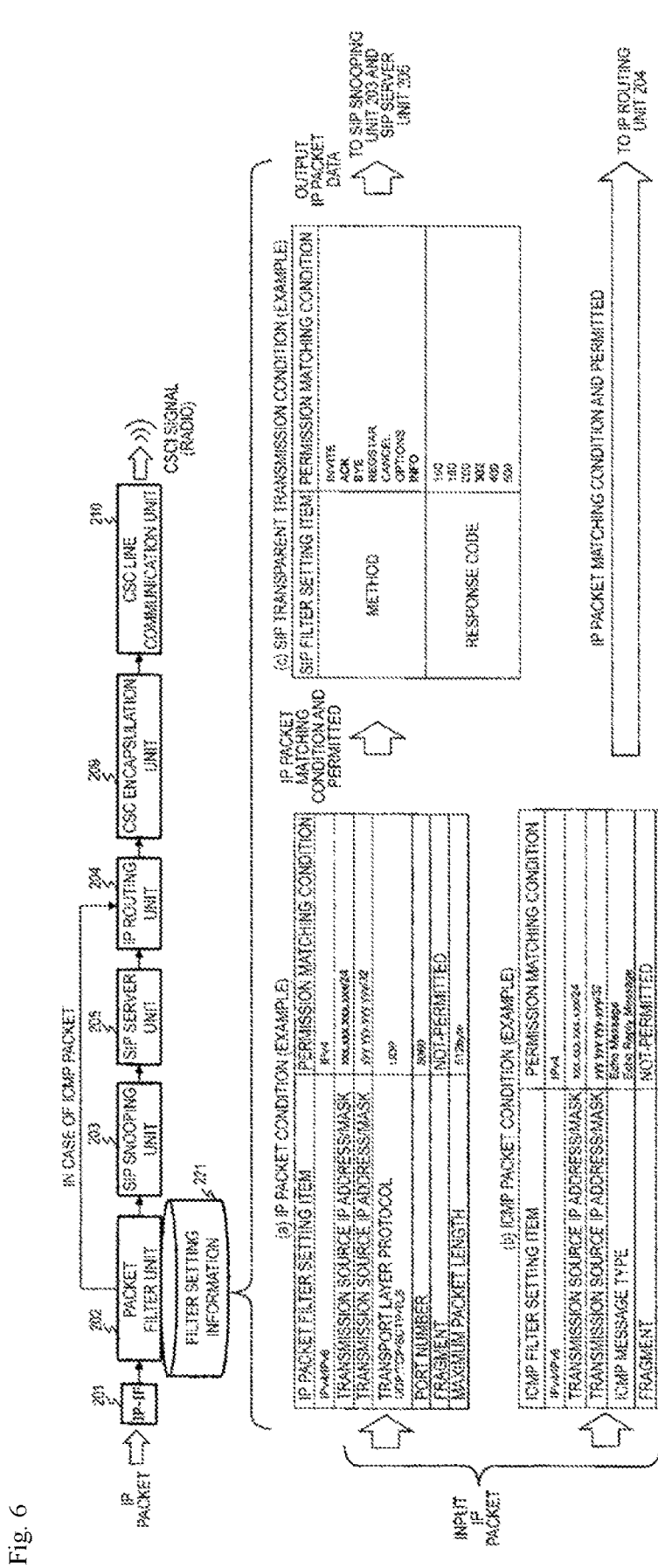
FIG. 6 is a diagram illustrating a processing example of a packet filter unit on the outgoing side.

FIG. 6 is a diagram illustrating a processing example of the packet filter unit 202 on the outgoing side. Note that in FIG. 6, respective blocks from the input of the IP packet to the transmission of the CSCI signal correspond to the blocks denoted by the same reference signs described in FIG. 2.

In FIG. 6, the packet filter unit 202 has filter setting information 221. A filter condition for filtering an IP packet input from the IP-IF 201 is described in the filter setting information 221 in advance, and the packet filter unit 202 filters the IP packet in accordance with the filter condition to output the IP packet to the later blocks.

Here, the filter condition described in the filter setting information 221 includes three conditions, (a) an IP packet condition, (b) an ICMP packet condition, and (c) a SIP transparent transmission condition illustrated in FIG. 6.

The IP packet condition specifies permission matching conditions for IP packet filter setting items. For example, set are IPv4 for an item of IPv4/IPv6, xxx.xxx.xxx.xxx/24 for an item of transmission source IP address/mask, yyy.yyy.yyy.yyy/32 for an item of transmission destination IP address/mask item, UDP for an item of transport layer protocol UDP/TCP/SCTP/TLS, 5060 for an item of port number, not-permitted for an item of fragment, 512 bytes for an item of maximum packet length, and the like.

The ICMP packet condition specifies permission matching conditions for ICMP filter setting items. For example, those the same as the IP packet condition are specified for the items of IPv4/IPv6, transmission destination IP address/mask, fragment, and maximum packet length. Echo Message and Echo Reply Message are set for an item of ICMP message type.

The SIP transparent transmission condition specifies permission matching conditions for SIP filter setting items. For example, for an item of method, INVITE, ACK, BYE, REGSTAR, CANCEL, OPTIONS, and INFO are permitted. For an item of response code, 100 ("100 Trying"), 180 ("180 Ringing"), 200 ("200 OK"), 302 ("Moved Temporary"), 400 ("Bad Request"), and 500 ("Server Internal Error") are permitted. Note that each of the conditions illustrated in FIG. 6 is an example, and the setting may be made such that the conditions illustrated in FIG. 6 are not permitted, or such that the conditions not illustrated in FIG. 6 are permission matching conditions.

In FIG. 6, the packet filter unit 202 transparently transmits a packet, among the IP packets input by the IP-IF 201, satisfying either of the permission matching conditions, the IP packet condition or the ICMP packet condition. The IP packet that matches the IP packet condition and permitted is further filtered by the SIP transparent transmission condition. Furthermore, the IP packet that matches the SIP transparent transmission condition and permitted is output to the SIP snooping unit 203, the SIP server unit 205, and the IP routing unit 204. The IP packet encapsulated in the CSCI signal by the CSC encapsulation unit 209 is transmitted from the CSC line communication unit 210 to the VSAT control earth station apparatus 103. Note that the IP packet that matches the ICMP packet condition and permitted is output to the IP routing unit 204 and encapsulated in the CSCI signal by the CSC encapsulation unit 209, and then, is transmitted from the CSC line communication unit 210 to the VSAT control earth station apparatus 103.

In this manner, the packet filter unit 202 filters the IP packet that is to be encapsulated in the CSCI signal for the CSC line and transmitted, in accordance with the IP packet condition, ICMP packet condition, SIP transparent transmission condition, and the like set in the filter setting information 221, and encapsulates only the required IP packet in the CSCI signal and transmits the encapsulation resultant. This can prevent the unnecessary IP packet from being transmitted in the CSCI signal, and reduce a line load of the burst type CSCI signal.

Figure 7:
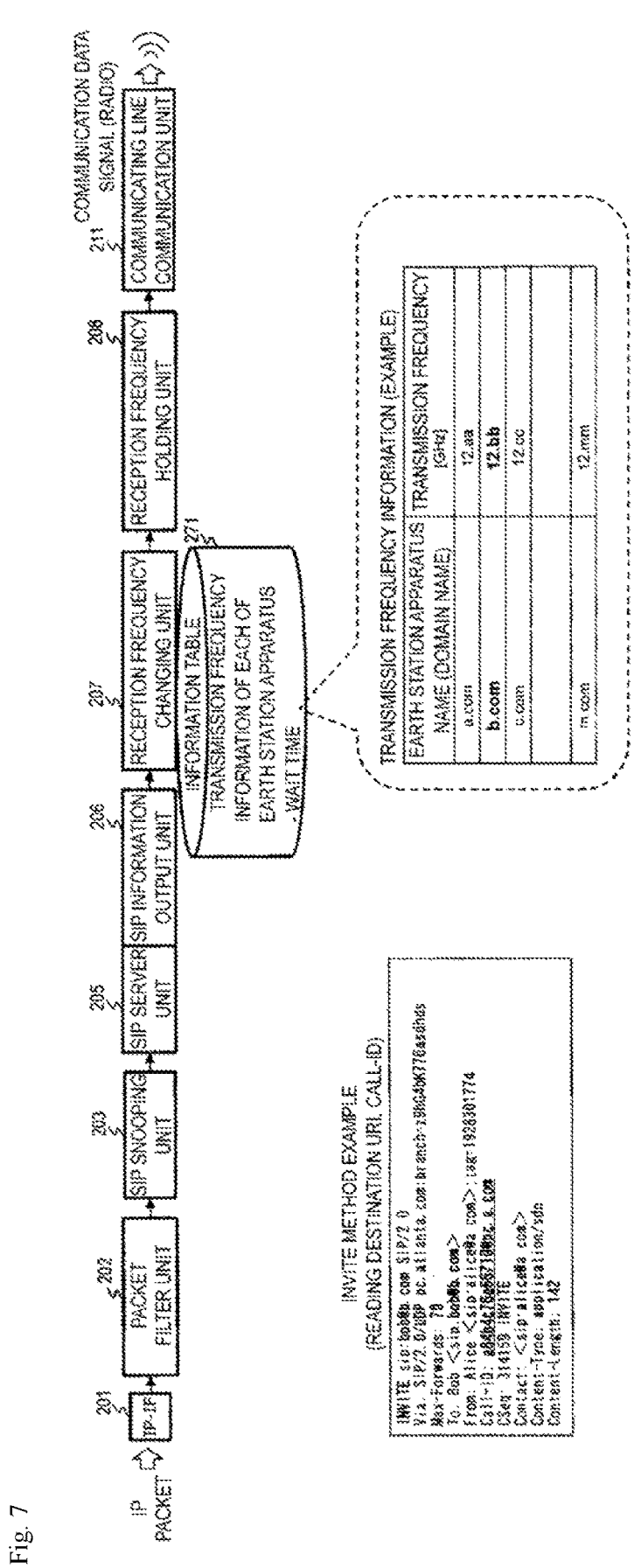
FIG. 7 is a diagram illustrating a processing example of a reception frequency changing unit on the outgoing side.

FIG. 7 is a diagram illustrating a processing example of the reception frequency changing unit 207 on the outgoing side. Note that in FIG. 7, respective blocks from the input of the IP packet to the transmission of the communication data signal correspond to the blocks denoted by the same reference signs described in FIG. 2.

In FIG. 7, the reception frequency changing unit 207 includes an information table 271 that holds predetermined transmission frequency information, wait time information, and the like. The information table 271 has a transmission frequency mapping table in which a name (such as a domain name) of the VSAT earth station apparatus 101 is associated with a transmission frequency for a communicating line that is predetermined for each of the VSAT earth station apparatuses 101 for example. In the example of FIG. 7, the transmission frequency mapping table is stored in advance in which a transmission frequency of a VSAT earth station apparatus 101 having a domain name "a.com" is 12.aa GHz, a transmission frequency of a VSAT earth station apparatus 101 having a domain name "b.com" is 12.bb GHz, a transmission frequency of a VSAT earth station apparatus 101 having a domain name "c.com" is 12.cc GHz, a transmission frequency of a VSAT earth station apparatus 101 having a domain name "m.com" is 12.mm GHz, and so on. Then, when the IP packet of the "INVITE method" output by the VoIP phone 104 is input from the IP-IF 201, the SIP information output unit 206 reads the information such as the transmission destination information (e.g., URI), the Call-ID, and the like of the "INVITE method" to output the read information to the reception frequency changing unit 207. The URI of the "INVITE method" illustrated in FIG. 7 is for b.com, and thus, the reception frequency changing unit 207 references the transmission frequency mapping table to confirm that the transmission frequency of the VSAT earth station apparatus 101 having the domain name "b.com" is 12.bb GHz. Then, the reception frequency changing unit 207 sets the reception frequency of the communicating line communication unit 211 to 12.bb GHz so as to receive the communication data signal transmitted on the communicating line from the VSAT earth station apparatus 101 having the domain name "b.com" that is the transmission destination.

Here, in the information table 271, the wait time for holding the reception frequency after setting the reception frequency for the communicating line is stored in advance. The wait time includes a time set to the standby timer after setting the reception frequency until communication is started on the communicating line, and a time set to the holding timer for holding the reception frequency after the communication is started on the communicating line. For example, the reception frequency changing unit 207 starts the standby timer after setting the reception frequency, and releases the lock of the reception frequency in a case that communication is not started on the communicating line until the wait time elapses (specifically, in a case that the "ACK method" is not confirmed). This can prevent the communicating line from remaining in a standby state in a case that the "ACK method" cannot be confirmed due to any cause such as a communication or system failure. The reception frequency holding unit 208 starts the holding timer after the communication is started on the communicating line, and releases the lock of the reception frequency in a case that the holding timer is not reset until the wait time elapses (specifically, in a case that the "INVITE method" is not periodically confirmed). This may prevent the communicating line from remaining locked in a case that the holding timer is not reset or the "BYE method" indicating the end of the communication cannot be confirmed due to any cause such as a communication or system failure.

In this manner, the reception frequency changing unit 207 references the transmission frequency mapping table to acquire the transmission frequency for the communicating line of the VSAT earth station apparatus 101 that is the transmission destination to which the communicating line is connected, and changes the reception frequency for the communicating line of the apparatus itself. The reception frequency changing unit 207 and the reception frequency holding unit 208 maintain or release the set configured reception frequency by use of the standby timer and the holding timer. This can adjust the reception frequency for the communicating line of the apparatus itself to the transmission frequency for the communicating line of the VSAT earth station apparatus 101 that is the transmission destination to enable circuit-switching of the communicating line between the VSAT earth station apparatuses 101 that are single-hop connected.

Figure 8:
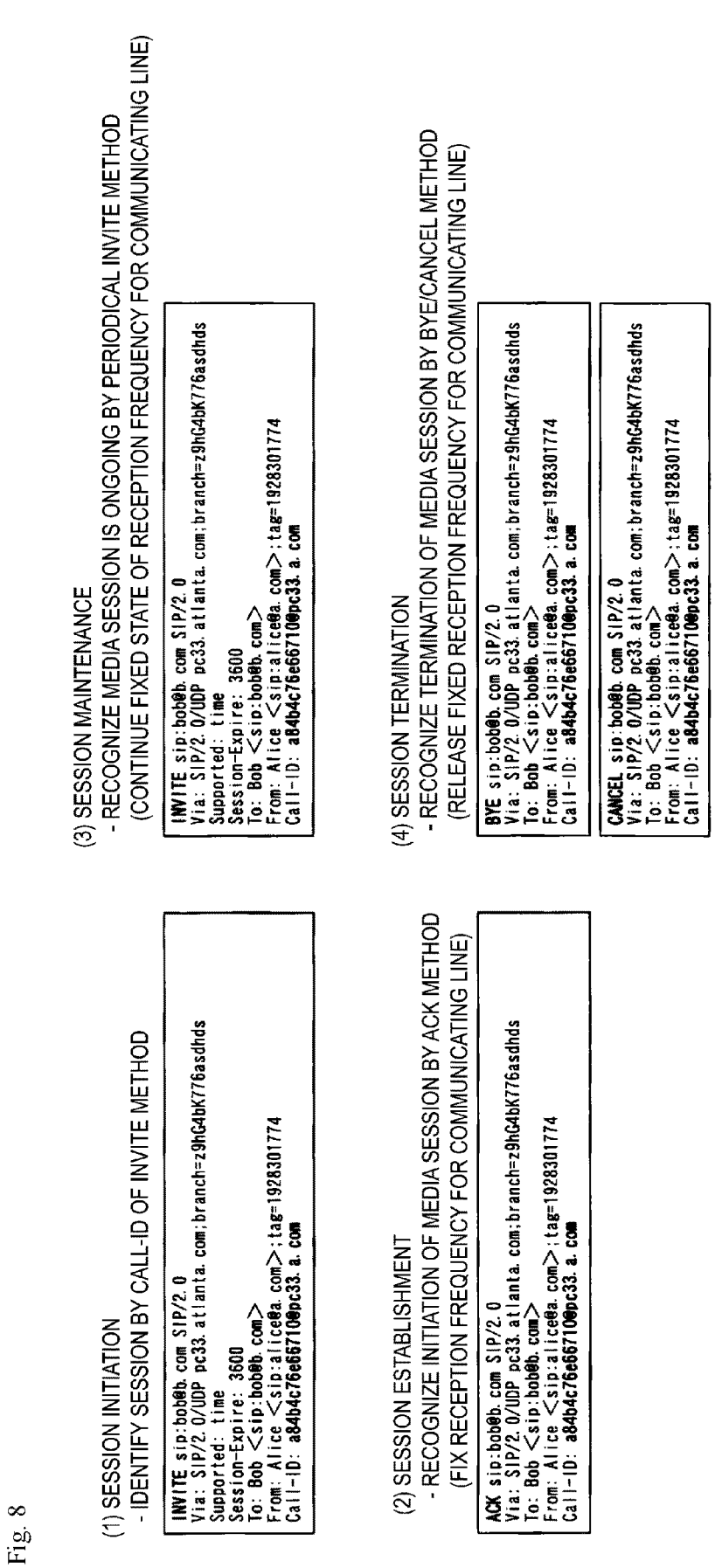
FIG. 8 is a diagram illustrating an example of control messages for SIP packets corresponding to initiation, establishment, maintenance and termination of a session.

FIG. 8 illustrates an example of each of the control messages for the SIP packets corresponding to initiation, establishment, maintenance and termination of a session.

In (1) the session initiation, the session is identified by the Call-ID of the "INVITE method". In the example of FIG. 8, the Call-ID is 'a84b4c76e66710@pc33.a.com.' Here, the reception frequency changing unit 207 sets the reception frequency for the communicating line to the transmission frequency for the communicating line of the VSAT earth station apparatus 101 accommodating the VoIP phone 104 that is the transmission destination of the "INVITE method", and starts the reception frequency standby timer.

In (2) the session establishment, the initiation of the media session is recognized by the "ACK method" having the Call-ID (a84b4c76e66710@pc33.a.com) the same as the "INVITE method" of (1). Here, the reception frequency changing unit 207 and the reception frequency holding unit 208 hold and fix the reception frequency for the communicating line, and start the reception frequency holding timer.

In (3) the session maintenance, it is recognized that the media session is ongoing by the periodical "INVITE method" having the Call-ID (a84b4c76e66710@pc33.a.com) the same as the "INVITE method" of (1). Here, the reception frequency changing unit 207 and the reception frequency holding unit 208 reset and restart the reception frequency holding timer, and continues the fixed state (hold state) of the reception frequency for the communicating line.

In (4) the session termination, the termination of the media session is recognized by the "BYE method" or the "CANCEL method" having the Call-ID (a84b4c76e66710@pc33.a.com) the same as the "INVITE method" of (1). Here, the reception frequency changing unit 207 and the reception frequency holding unit 208 release the fixed reception frequency for the communicating line.

In this way, the reception frequency changing unit 207 and the reception frequency holding unit 208 set the reception frequency for the communicating line of the apparatus itself, and maintain or release the set reception frequency.

Figure 9:
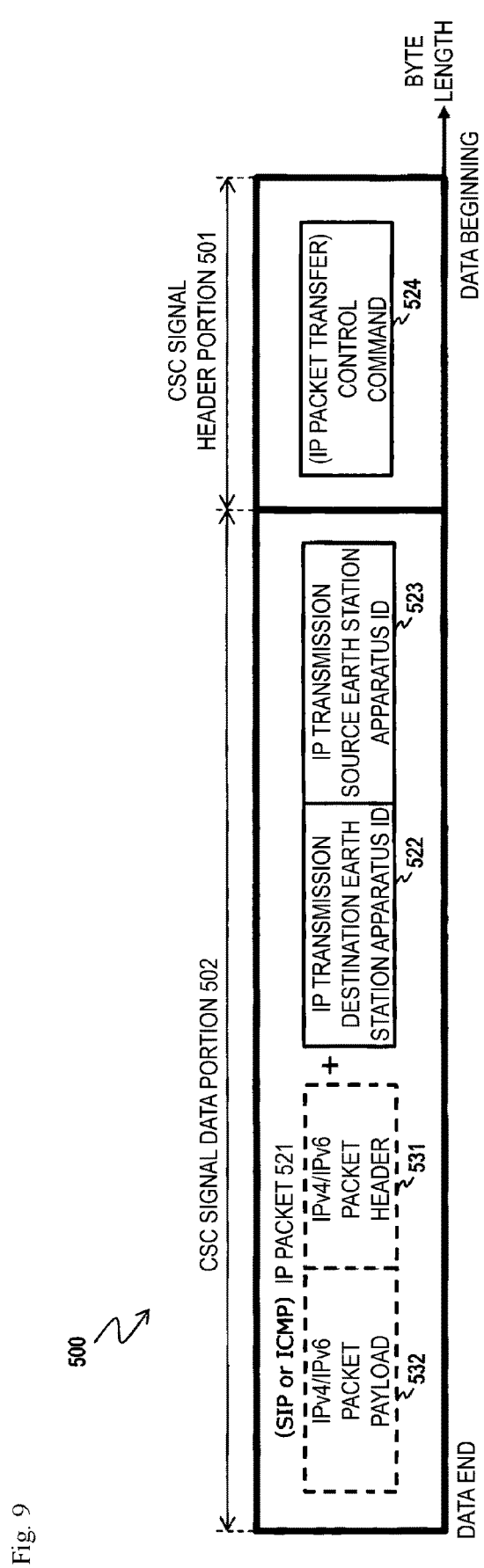
FIG. 9 is a diagram illustrating a frame format of a CSC signal according to the present embodiment.

FIG. 9 illustrates a frame format 500 of a CSC signal according to the present embodiment. In FIG. 9, the frame format 500 includes a CSC signal header portion 501 and a CSC signal data portion 502. The CSC signal header portion 501 stores a control command 524 for IP packet transfer. The CSC signal data portion 502 stores an IP packet 521 of SIP or ICMP, and an IP transmission destination earth station apparatus ID 522 and an IP transmission source earth station apparatus ID 523. Note that the IP packet 521 has a IPv4/Ipv6 packet header 531 and a IPv4/Ipv6 packet payload 532. Here, the control command 524 is a command for controlling the VSAT earth station apparatus 101, and is described at a fixed location of the CSC signal header portion 501 in a byte string having a fixed length. For example, the control command 524 is used as a command to set the transmission frequency of the VSAT earth station apparatus 101, a command to initiate radio transmission, a command to forcedly stop radio transmission, a command to acquire (request) information of a received state, and the like. In the present embodiment, a new control command 524 is defined as a command to transfer an IP packet to allow the VSAT earth station apparatus 101 and the VSAT control earth station apparatus 103 receiving the CSC signal to perform appropriate transfer processing.

In this manner, an IP packet such as a SIP packet or an ICMP packet is encapsulated in the CSC signal, and is transmitted via the relay satellite 102 and the VSAT control earth station apparatus 103 to the VSAT earth station apparatus 101 that is the transmission destination.

Figure 10:
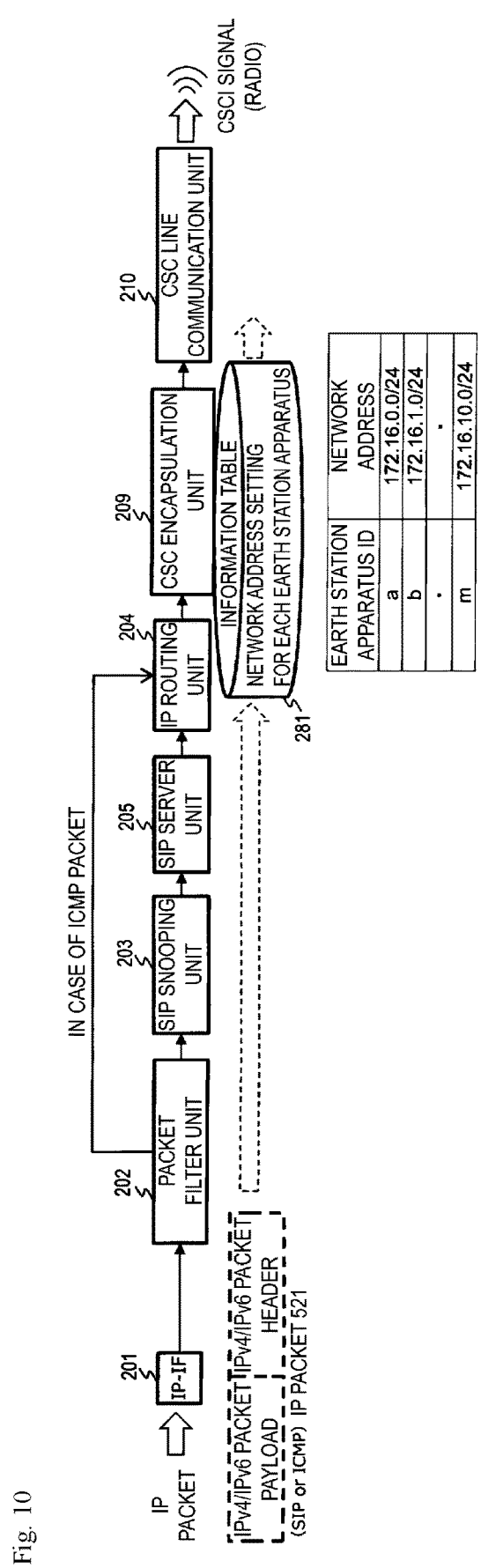
FIG. 10 is a diagram illustrating a processing example of a CSC encapsulation unit on the outgoing side.

FIG. 10 illustrates a processing example of the CSC encapsulation unit 209 on the outgoing side. Note that in FIG. 10, respective blocks from the input of the IP packet to the transmission of the CSCI signal correspond to the blocks denoted by the same reference signs described in FIG. 2.

In FIG. 10, the CSC encapsulation unit 209 includes an information table 281 in which a network address preassigned to each VSAT earth station apparatus 101 is associated with the ID of the VSAT earth station apparatus 101. The information table 281 stores a network address table, and the ID of the VSAT earth station apparatus 101 (a, b, m, etc.) can be recognized from the network address, for example. In the example of FIG. 10, the network address of the VSAT earth station apparatus 101 having the ID "a" is 172.16.0.0/24, the network address of the VSAT earth station apparatus 101 having the ID "b" is 172.16.1.0/24, and the network address of the VSAT earth station apparatus 101 having the ID "m" is 172.16.10.0/24.

The CSC encapsulation unit 209 extracts the network address of the IP packet output by the IP routing unit 204, and references the network address table to confirm the ID of the VSAT earth station apparatus 101. As illustrated in FIG. 9, the CSC encapsulation unit 209 adds, to the IP packet to be transmitted through CSC signal, the ID of the VSAT earth station apparatus 101 that is the transmission source and the ID of the VSAT earth station apparatus 101 that is the transmission destination, to store the resultant in to the CSC signal data section 502, and stores the control command 524 for IP packet transfer in the CSC signal header portion 501 to encapsulate the IP packet to be transmitted through CSC signal in the CSC signal.

In this manner, the VSAT earth station apparatus 101 according to the present embodiment can encapsulate the IP packet to be transmitted through CSC signal, among the IP packets input from the IP-IF 201, in the CSCI signal to transmit the encapsulated IP packet via the relay satellite 102 to the VSAT control earth station apparatus 103.

As described above, the VSAT system 100 according to the present embodiment encapsulates SIP packets in a control signal to transmit the encapsulation resultant from the outgoing side VSAT earth station apparatus 101 via the relay satellite 102 to the VSAT control earth station apparatus 103, and the encapsulated control signal is transparently transmitted from the VSAT control earth station apparatus 103 via the relay satellite 102 to the incoming side VSAT earth station apparatus 101, and thereby, can perform circuit-switching of the communicating line between the VSAT earth station apparatuses 101 performing a P to P communication in the single hop connection in the satellite channel using the simple transmission frequency fixed assignment scheme.

In particular, the VSAT earth station apparatus 101 according to the present embodiment automates the circuit-switching of the communicating line in conjunction with the SIP transaction state and the SIP signaling sequence, and thus, the circuit-switching can be performed between the VSAT earth station apparatuses 101 in the P to P communication in the single hop connection that does not require the HUB station apparatus.

In the VSAT system 100 according to the present embodiment, the VSAT earth station apparatus 101 can filter an inappropriate packet for transmission on the CSC line, and extracts and transmits only the SIP packet necessary for circuit-switching to reduce the occurrence of collision of the CSC line.

The outgoing side VSAT earth station apparatus 101 encapsulates the IP packet to be transmitted through CSC in the CSC signal, and thereby, the IP packet without being decoded by the VSAT control earth station apparatus 103 can be transferred to the incoming side VSAT earth station apparatus 101.

Each of the SIP information output units 206 of the VSAT earth station apparatuses 101 operating as the SIP proxy servers on the outgoing side and the incoming side extracts the SIP transaction information to acquire the transmission frequency of the communications partner VSAT earth station apparatus 101 in accordance with SIP transaction information, and change the reception frequency of the apparatus itself, such that it is possible to ensure synchronization (timing of reception frequency change) and consistency with the SIP transaction by the VoIP phone 104.

The opposing VSAT earth station apparatuses 101 mutually adjust the frequencies of the reception carriers of themselves to the frequencies of the transmission carriers of the opposing partners in conjunction with the signaling sequence by the control message such as the "INVITE method" of the SIP or the response code "180 Ringing", and thereby, the circuit-switching of the communicating line can be performed automatically.

The VSAT system 100 according to the present embodiment can perform the circuit-switching of the single hop P to P connection simply by operating the terminal to be used (SIP_UA terminal) without need of operating the VSAT earth station apparatus 101.

As described above, the satellite communication system, the earth station apparatus, and the circuit switching control method according to the present invention can perform circuit-switching of a communicating line between VSAT earth station apparatuses performing a P to P communication in a single hop connection in a satellite channel using a simple transmission frequency fixed assignment scheme by such a way in which SIP packets are encapsulated in a control signal and transmitted from an outgoing side earth station apparatus via a relay satellite to a control earth station apparatus, the encapsulated control signal is transparently transmitted from the control earth station apparatus via the relay satellite to an incoming earth station apparatus, and a reception frequency of the own apparatus is adjusted to a transmission frequency of the opposing earth station apparatus in accordance with information of the SIP packets.

REFERENCE SIGNS LIST

100 . . . VSAT system
101 . . . VSAT earth station apparatus
102 . . . Relay satellite
103 . . . VSAT control earth station apparatus
104 . . . VoIP phone
201 . . . IP-IF
202 . . . Packet filter unit
203 . . . SIP snooping unit
204 . . . IP routing unit
205 . . . SIP server unit
206 . . . SIP information output unit
207 . . . Reception frequency changing unit
208 . . . Reception frequency holding unit
209 . . . CSC encapsulation unit
210 . . . CSC line communication unit
211 . . . Communicating line communication unit
221 . . . Filter setting information
271 . . . Information table
241 . . . CSC line route map
242 . . . Communicating line route map
301 . . . CSC line communication unit
302 . . . IP packet transfer unit
303 . . . CSCI-CSCO conversion unit
304 . . . CSC encapsulation unit
305 . . . IP routing unit
306 . . . Packet filter unit
307 . . . IP-IF
500 . . . Frame format
502 . . . CSC signal data portion
501 . . . CSC signal header portion
521 . . . IP packet
522 . . . IP transmission destination earth station apparatus ID
523 . . . IP transmission source earth station apparatus ID
524 . . . Control command

The invention claimed is:

1. A satellite communication system comprising:
a plurality of earth station apparatuses each comprising at least one processor; and
a control earth station apparatus comprising at least one processor,
the plurality of earth station apparatuses each accommodating a corresponding terminal apparatus of a plurality of terminal apparatuses each of which establishes a session by using one or more control messages being dedicated to perform communication, the control earth station apparatus performing at least one of transmitting or receiving one or more control signals on one or more controlling lines to a corresponding earth station apparatus of the plurality of earth station apparatuses via a relay satellite, and the satellite communication system performing circuit-switching of one or more communicating lines between the plurality of earth station apparatuses that are connected by single-hop connection to allow the plurality of the terminal apparatuses to perform communication with each other, wherein a first earth station apparatus accommodating a first terminal apparatus on an outgoing side among the plurality of earth station apparatuses is configured to:

encapsulate, using the at least one processor, a first control message of the one or more control messages received from the first terminal apparatus in a first control signal of the one or more control signals to transfer the first control signal including the encapsulated first control message through a first controlling line of the one or more controlling lines to a second earth station apparatus accommodating a second terminal apparatus on an incoming side among the plurality of earth station apparatuses; and perform, using the at least one processor, circuit-switching of the first communicating line between the first earth station apparatus and the second earth station apparatus in accordance with the first control message;

wherein the first earth station apparatus is configured to:

include a table in which a piece of information of the second earth station apparatus of the plurality of earth station apparatuses is associated with a first transmission frequency that is fixed and pre-assigned for the second earth station apparatus to perform communication on the first communicating line using the first transmission frequency;

extract, from the table and using the at least one processor, another piece of information of the second earth station apparatus of the plurality of earth station apparatuses accommodating the second terminal apparatus as a transmission destination of the first control message received from the first terminal apparatus that the first earth station apparatus accommodates;

acquire, from the table and using the at least one processor, the first transmission frequency for the first communicating line of the second earth station apparatus; and change, using the at least one processor, a reception frequency for the first communicating line of the first earth station apparatus to be identical to the acquired first transmission frequency for the first communicating line of the second earth station apparatus to perform the circuit-switching of the first communicating line.

2. The satellite communication system according to claim 1, wherein the one or more control messages include a session initiation protocol (SIP) packet, the one or more control signals include a common signaling channel (CSC) signal, each of the earth station apparatuses corresponds to a very small aperture terminal (VSAT) earth station apparatus, and the control earth station apparatus corresponds to a VSAT control earth station apparatus, and the VSAT earth station apparatus performs circuit-switching of the one or more communicating lines in conjunction with a SIP transaction state and a signaling sequence.

3. A first earth station apparatus comprising: at least one processor; and a transceiver, the first earth station apparatus is configured to accommodate, using the at least one processor, a first terminal apparatus that establishes a session by using a control message being dedicated to perform communication, transmit, using the transceiver, or receive a control signal on a controlling line to a control earth station apparatus via a relay satellite, and perform, using the at least one processor, circuit-switching of a communicating line with a second earth station apparatus that is connected to the first earth station apparatus by single-hop connection, wherein in a case that the first earth station apparatus is on an outgoing side among a plurality of earth station apparatuses, the first earth station apparatus is configured to:

encapsulate, using the at least one processor, the control message received from the first terminal apparatus in the control signal to transfer the control signal including the encapsulated control message through the controlling line to the second earth station apparatus on an incoming side among the plurality of earth station apparatuses accommodating a second terminal apparatus; and perform, using the at least one processor, circuit-switching of the communicating line with the second earth station apparatus on the incoming side in accordance with the control message;

wherein the first earth station apparatus is further configured to:

include a table in which a piece of information of the second earth station apparatus of the plurality of earth station apparatuses is associated with a first transmission frequency that is fixed and pre-assigned for the second earth station apparatus to perform communication on the communicating line using the first transmission frequency;

extract, from the table and using the at least one processor, another piece of information of the second earth station apparatus of the plurality of earth station apparatuses accommodating the second terminal apparatus as a transmission destination of the control message received from the first terminal apparatus that the first earth station apparatus accommodates;

acquire, from the table and using the at least one processor, the first transmission frequency for the communicating line of the second earth station apparatus; and change, using the at least one processor, a reception frequency for the communicating line of the first earth station apparatus to be identical to the acquired first transmission frequency for the first communicating line of the second earth station apparatus to perform the circuit-switching of the communicating line.

4. A circuit switching control method in a satellite communication system, the satellite communication system including a plurality of earth station apparatuses and a control earth station apparatus, the plurality of earth station apparatuses each accommodating a corresponding terminal apparatus of a plurality of terminal apparatuses each of which establishes a session by using one or more control messages being dedicated to perform communication, the control earth station apparatus performing at least one of transmitting or receiving one or more control signals on one or more controlling lines to a corresponding earth station apparatus of the plurality of earth station apparatuses via a relay satellite, and the satellite communication system performing circuit-switching of one or more communicating lines between the plurality of earth station apparatuses that are connected by single-hop connection allow the plurality of the terminal apparatuses to perform communication with each other, the circuit switching control method comprising:

by a first earth station apparatus comprising at least one processor accommodating a first terminal apparatus on an outgoing side among the plurality of earth station apparatuses, encapsulating, using the at least one processor, a first control message of the one or more control messages received from the first terminal apparatus in a first control signal of the one or more control signals to transfer the first control signal including the encapsulated first control message through a first controlling line of the one or more controlling lines to a second earth station apparatus accommodating a second terminal apparatus on an incoming side among the plurality of earth station apparatuses; and performing, using the at least one processor, circuit-switching of the first communicating line between the first earth station apparatus and the second earth station apparatus in accordance with the first control message;

wherein the circuit switching control method further comprises: by the first earth station apparatus, including a table in which a piece of information of the second earth station apparatus of the plurality of earth station apparatuses is associated with a first transmission frequency that is fixed and pre-assigned for the second earth station apparatus to perform communication on the first communicating line using the first transmission frequency;

extracting, from the table and using the at least one processor, another piece of information of the second earth station apparatus of the plurality of earth station apparatuses accommodating the second terminal apparatus as a transmission destination of the first control message received from the first terminal apparatus that the first earth station apparatus accommodates;

acquiring, from the table and using the at least one processor, the first transmission frequency for the first communicating line of the second earth station apparatus; and changing, using the at least one processor, a reception frequency for the first communicating line of the first earth station apparatus to be identical to the acquired first transmission frequency for the first communicating line of the second earth station apparatus to perform the circuit-switching of the first communicating line.

5. The circuit switching control method according to claim 4, wherein the one or more control messages include a session initiation protocol (SIP) packet, the one or more control signals include a common signaling channel (CSC) signal, each of the earth station apparatuses corresponds to a very small aperture terminal (VSAT) earth station apparatus, and the control earth station apparatus corresponds to a VSAT control earth station apparatus, and the circuit-switching of the one or more communicating lines is performed in conjunction with a SIP transaction state and a signaling sequence.

* * * * *